United States Patent
Ezal et al.

(10) Patent No.: US 10,620,296 B1
(45) Date of Patent: Apr. 14, 2020

(54) SYSTEM FOR POSITIONING, NAVIGATION, AND TIME (PNT)

(71) Applicant: TOYON RESEARCH CORPORATION, Goleta, CA (US)

(72) Inventors: Kenan Osman Ezal, Santa Barbara, CA (US); Gregory M. Johnson, Goleta, CA (US)

(73) Assignee: TOYON RESEARCH CORPORATION, Goletta, CA (US)

(*) Notice: Subject to any disclaimer, the term of this patent is extended or adjusted under 35 U.S.C. 154(b) by 286 days.

(21) Appl. No.: 15/858,260

(22) Filed: Dec. 29, 2017

Related U.S. Application Data

(60) Provisional application No. 62/432,702, filed on Jan. 3, 2017.

(51) Int. Cl.

| | |
|---|---|
| G01S 5/02 | (2010.01) |
| G01S 1/20 | (2006.01) |
| G01S 5/14 | (2006.01) |
| G01S 5/10 | (2006.01) |
| G01S 19/05 | (2010.01) |
| G01S 19/46 | (2010.01) |

(52) U.S. Cl.
CPC .............. *G01S 5/0268* (2013.01); *G01S 1/20* (2013.01); *G01S 5/10* (2013.01); *G01S 5/145* (2013.01); *G01S 19/05* (2013.01); *G01S 19/46* (2013.01)

(58) Field of Classification Search
CPC . G01S 3/043; G01S 3/48; G01S 19/36; G01S 19/39; G01S 19/45; G01S 5/06; G01S 3/14; G01S 3/30; G01S 1/00; G01S 5/04; G01S 5/0221; G01S 5/0268; H01Q 21/29; H01Q 1/288; H04B 1/44; H04B 1/18
See application file for complete search history.

(56) References Cited

U.S. PATENT DOCUMENTS

| | | |
|---|---|---|
| 3,096,480 A | 7/1963 | Pihl |
| 3,495,247 A | 2/1970 | Perkins |
| 3,534,399 A | 10/1970 | Hirsch |
| 3,680,118 A | 7/1972 | Anthony |
| 3,919,529 A | 11/1975 | Baker et al. |
| 3,975,731 A | 8/1976 | Latham et al. |
| 4,069,412 A | 1/1978 | Foster et al. |
| 4,583,177 A | 4/1986 | Meyer |
| 5,117,489 A | 5/1992 | Komori et al. |

(Continued)

OTHER PUBLICATIONS

Britting, K. R., *Inertial Navigation Systems Analysis*.: John Wiley and Sons, 1971.

(Continued)

*Primary Examiner* — Olumide Ajibade Akonai
(74) *Attorney, Agent, or Firm* — Nixon & Vanderhye P.C.

(57) ABSTRACT

An exemplary radio-frequency (RF)-based navigation reference system uses one or more non-collocated and time-synchronized direction-finding transmitters to enable a client receiver to estimate its own 3-D position, velocity and time (PVT) using direction-finding (DF) waveforms obtained from said reference transmitters. At least one reference transmitter is sufficient for obtaining a 3-D PVT solution provided the client receiver is equipped with an accurate (low-drift) local clock such as a chip-scale atomic clock (CSAC). All other client receivers require at least two reference transmitters to estimate their 3-D PVT.

22 Claims, 18 Drawing Sheets

(56) References Cited

U.S. PATENT DOCUMENTS

| | | | |
|---|---|---|---|
| 5,311,194 A | 5/1994 | Brown | |
| 5,686,924 A | 11/1997 | Trimble et al. | |
| 5,786,773 A | 7/1998 | Murphy | |
| 5,886,666 A | 3/1999 | Schellenberg et al. | |
| 7,075,482 B2* | 7/2006 | Karlsson | G01S 3/14 342/13 |
| 7,079,025 B2 | 7/2006 | Michalson et al. | |
| 7,268,728 B1* | 9/2007 | Struckman | G01S 5/04 342/424 |
| 8,305,265 B2 | 11/2012 | Ezal et al. | |
| 9,429,639 B2 | 8/2016 | Bartone | |
| 9,645,243 B2 | 5/2017 | Wendel | |
| 10,031,234 B1* | 7/2018 | Alexander | G01S 19/215 |
| 2004/0085242 A1* | 5/2004 | Brousseau | G01C 21/206 342/387 |
| 2004/0164901 A1* | 8/2004 | Karlsson | G01S 5/021 342/449 |
| 2008/0303714 A1* | 12/2008 | Ezal | G01C 21/005 342/357.22 |
| 2010/0007555 A1* | 1/2010 | Ezal | G01C 21/005 342/357.3 |

OTHER PUBLICATIONS

Cohen, C. E., "Attitude Determination," in *Global Positioning System: Theory and Applications, Vol. II.*, 1996, pp. 519-538.

Compton, R.T. Jr., *Adaptive Antennas, Concepts and Performance.* Englewood Cliffs, New Jersey: Prentice Hall, 1988.

Corzine, Robert G. et al., *Four-Arm Spiral Antennas*: Artech House, 1990.

Elrod, Bryant D., et al. "Pseudolites," in *Global Positioning System: Theory and Applications, Volume II.*: American Institute of Aeronautics and Astronautics, Inc., 1996.

Farrell, James L., *GNSS Aided Navigation and Tracking: Inertially Augmented or Autonomous*: American Literary Press, 2007.

Groves, Paul D., *Principles of GNSS, Inertial, and Multisensor Integrated Navigation Systems*, 2nd ed.: Artech House, 2013.

Guerci, J. R., *Space-Time Adaptive Processing for Radar*. Norwood, MA: Artech House, 2003.

Johnson, Richard C., et al., *Antenna Engineering Handbook*, 2nd ed.: McGraw Hill Book Company, 1984.

Kaplan, D.E., Ed., *Understanding GPS Principles and Applications*, 1st ed. Norwood, MA: Artech House, 1996.

Klemm, Richard, *Space-Time Adaptive Processing, Principles and Applications*. London: The Institute of Electrical Engineers, 1998.

Li, Jian, et al., *Robust Adaptive Beamforming.*: Wiley Interscience, 2006.

Lipsky, Stephen E., *Microwave Passive Direction Finding.*: John Wiley & Sons, Inc., 1987.

Mailloux, Robert J., *Phased Array Antenna Handbook.*: Artech House, 1994.

Misra, Pratap et al., *Global Positioning System: Signals, Measurements, and Performance*. Lincoln, Massachusetts: Ganga-Jamuna Press, 2004.

Parkinson, B.W. et al., *Global Positioning System: Theory and Applications*, Paul Zarchan, Ed. Cambridge, Massachusetts: AIAA, 1996.

Sherman, Samuel M., *Monopulse Principles and Techniques.*: Artech House, 1984.

Van Diggelen, Frank, *A-GPS: Assisted GPS, GNSS, and SBAS.*: Artech House, 2009.

Van Trees, H. L., *Optimum Array Processing, Part IV of Detection, Estimation, and Modulation Theory*. New York: Wiley-Interscience, 2002.

Zekavat, Seyed A., et al., *Handbook of Position Location: Theory, Practice, and Advances*. IEEE Press, 2012.

Gordon, N., "A hybrid bootstrap filter for target tracking in clutter," *IEEE Transactions on Aerospace and Electronic Systems*, vol. 33, pp. 353-358, Jan. 1997.

Julier, Simon J., et al., "Unscented Filtering and Nonlinear Estimation," *Proceedings of the IEEE*, vol. 92, No. 3, pp. 401-422, Mar. 2004.

Kalman, R.E., "A New Approach to Linear Filtering and Prediction Problems," *Transaction of the ASME—Journal of Basic Engineering*, pp. 35-45, 1960.

Penno, R.P. et al., "Theory of Angle Estimation Using Multiarm Spiral Antennas," *IEEE Transactions on Aerospace and Electronic Systems*, 2001.

Peterson, B.R. et al., "Investigation of Common Architectures for Land- and Sea-Based JPALS," in *ION International Technical Meeting*, Long Beach, CA, 2005, pp. 26-37.

Schmidt, Ralph Otto, "Multiple Emitter Location and Signal Parameter Estimation," *IEEE Transactions on Antennas and Propagation*, vol. 34, No. 3, Mar. 1986.

Titterton, David et al., *Strapdown Intertial Navigation Technology*, 2d Edition, The Institution of Engineering and Technology, 2004.

\* cited by examiner

SYSTEM FOR POSITIONING, NAVIGATION, AND TIME (PNT)

RELATED APPLICATIONS

This non-provisional application claims priority rights pursuant to 35 U.S.C. § 119(e) based on U.S. Provisional Application Ser. No. 62/432,702 filed on Jan. 3, 2017, titled "System for Positioning, Navigation, and Time (PNT)" naming Kenan Osman Ezal and Gregory M. Johnson as inventors. Application Ser. No. 62/432,702 is hereby incorporated by reference.

BACKGROUND

1. Technical Field

In general, the present application relates to the field of radio-frequency (RF)-based precision navigation and positioning systems. Specifically, it relates to radio-based navigation and positioning reference transmitters and client receivers for use with or in the absence of a Global Navigation Satellite System (GNSS) such as the Global Positioning System (GPS), Galileo, and GLONASS; as well as the field of precision relative positioning, navigation, and time (PNT).

2. List of References

U.S. Patents

| | | | |
|---|---|---|---|
| 3,096,480 | July 1963 | Pihl | 342/76.83 |
| 3,495,247 | February 1970 | Perkins | 342/401 |
| 3,534,399 | October 1970 | Hirsch | 701/492 |
| 3,680,118 | July 1972 | M. L. Anthony | 343/106 R |
| 3,919,529 | November 1975 | Baker et al | 235/150.27 |
| 3,975,731 | August 1976 | Latham et al | 343/7.3 |
| 4,069,412 | January 1978 | Foster et al | 701/467 |
| 4,583,177 | April 1986 | D. H. Meyer | 701/492 |
| 5,117,489 | January 1993 | R. R. Hatch | 342/357 |
| 5,311,194 | May 1994 | A. K. Brown | 342/357.24 |
| 5,686,924 | November 1997 | C. R. Trimble et al | 342/357 |
| 5,786,773 | July 1998 | T. A. Murphy | 340/947 |
| 5,886,666 | March 1999 | S. R. Schellenberg et al | 342/357 |
| 7,079,025 B2 | July 2006 | W. R. Michalson and I. F. Progri | 340/539.13 |
| 8,305,265 B2 | October 2012 | K. Ezal and B. Werner | 342/357.36 |
| 9,429,639 B2 | August 2016 | C. G. Bartone | G01S 1/02 |
| 9,645,243 B2 | May 2017 | J. Wendel | G01S 19/11 |

Books

K. R. Britting, *Inertial Navigation Systems Analysis*.: John Wiley and Sons, 1971.

C. E. Cohen, "Attitude Determination," in *Global Positioning System: Theory and Applications, Vol. II.*, 1996, pp. 519-538.

R. T. Compton Jr., *Adaptive Antennas, Concepts and Performance*. Englewood Cliffs, N.J.: Prentice Hall, 1988.

Robert G. Corzine and Joseph A. Mosko, *Four-Arm Spiral Antennas*.: Artech House, 1990.

Bryant D. Elrod and A. J. Van Dierendonck, "Pseudolites," in *Global Positioning System: Theory and Applications, Volume II.*: American Institute of Aeronautics and Astronautics, Inc., 1996.

James L. Farrell, *GNSS Aided Navigation and Tracking: Inertially Augmented or Autonomous*.: American Literary Press, 2007.

Paul D. Groves, *Principles of GNSS, Inertial, and Multisensor Integrated Navigation Systems*, 2nd ed.: Artech House, 2013.

J. R. Guerci, *Space-Time Adaptive Processing for Radar*. Norwood, Mass.: Artech House, 2003

Richard C. Johnson and Henry Jasik, *Antenna Engineering Handbook*, 2nd ed.: McGraw Hill Book Company, 1984.

D. E. Kaplan, Ed., *Understanding GPS Principles and Applications*, 1st ed. Norwood, Mass.: Artech House, 1996.

Richard Klemm, *Space-Time Adaptive Processing, Principles and Applications*. London: The Institute of Electrical Engineers, 1998.

Jian Li and Petre Stoica, *Robust Adaptive Beamforming*.: Wiley Interscience, 2006.

Stephen E. Lipsky, *Microwave Passive Direction Finding*.: John Wiley & Sons, Inc., 1987.

Robert J. Mailloux, *Phased Array Antenna Handbook*.: Artech House, 1994.

Pratap Misra and Per Enge, *Global Positioning System: Signals, Measurements, and Performance*. Lincoln, Mass.: Ganga-Jamuna Press, 2004.

B. W. Parkinson, J. J. Spilker Jr., P. Axelrod, and P. Enge, *Global Positioning System: Theory and Applications*, Paul Zarchan, Ed. Cambridge, Mass.: AIAA, 1996.

Samuel M. Sherman, *Monopulse Principles and Techniques*.: Artech House, 1984.

David Titterton and John Weston, *Strapdown Inertial Navigation Technology*, 2nd ed.: The Institution of Engineering and Technology, 2004.

Frank Van Diggelen, *A-GPS: Assisted GPS, GNSS, and SBAS*.: Artech House, 2009.

H. L. Van Trees, *Optimum Array Processing, Part IV of Detection, Estimation, and Modulation Theory*. New York: Wiley-Interscience, 2002.

Seyed A. Zekavat and R. Michael Buehrer, *Handbook of Position Location: Theory, Practice, and Advances*. IEEE Press, 2012.

Articles

N. Gordon, "A hybrid bootstrap filter for target tracking in clutter," *IEEE Transactions on Aerospace and Electronic Systems*, vol. 33, pp. 353-358, January 1997.

Simon J. Julier and Jeffrey K. Uhlmann, "Unscented Filtering and Nonlinear Estimation," *Proceedings of the IEEE*, vol. 92, no. 3, pp. 401-422, March 2004.

R. E. Kalman, "A New Approach to Linear Filtering and Prediction Problems," *Transaction of the ASME—Journal of Basic Engineering*, pp. 35-45, 1960.

B. R. Peterson et al., "Investigation of Common Architectures for Land- and Sea-Based JPALS," in *ION International Technical Meeting*, Long Beach, Calif., 2005, pp. 26-37.

R. P. Penno and K. M. Pasala, "Theory of Angle Estimation Using Multiarm Spiral Antennas," *IEEE Transactions on Aerospace and Electronic Systems*, 2001.

Ralph Otto Schmidt, "Multiple Emitter Location and Signal Parameter Estimation," *IEEE Transactions on Antennas and Propagation*, vol. 34, no. 3, March 1986.

3. Related Art

Worldwide, the various GNSS, including GPS have become the primary sensors for positioning, navigation and time. All GNSS systems make use of radio-frequency (RF)-based time-of-arrival (TOA), time difference-of-arrival (TDOA), and frequency difference-of-arrival (FDOA)/differential-Doppler (DD) measurements for positioning, navigation, and timing (PNT). Through the use of satellite (and/or pseudolite) almanac and ephemeris information that is included in the GNSS navigation message embedded in the transmitted RF waveform, the time-of-arrival and differential Doppler measurements can be converted into pseudorange (from satellite) and pseudorange-rate measurements, respectively.

GNSS satellites and pseudolites are emitters that are reference stations or beacons whose positions are obtained from the almanac and ephemeris information embedded in the GNSS navigation message. Each satellite/pseudolite has a unique pseudo-random number (PRN) code that is known to client receivers. A passive (non-emitting) client receiver uses the known PRN codes to track signals transmitted by reference stations to determine its own time and position. For three-dimensional (3-D) position, velocity, and time (PVT) estimation, an unaided GNSS receiver requires at least four satellite or pseudolite signals, or a combination of both. The pseudorange measurements from the (at least) four satellites/pseudolites are used to compute the unknown 3-D position of the client receiver and the unknown clock offset of the client receiver relative to the GNSS reference system. GNSS-based 3-D attitude (roll, pitch, and yaw) estimates can be obtained without external aiding, such as from an inertial sensor, using direction-finding (DF) antennas or multiple-element antennas with large baselines.

While GNSS provides good position accuracy that is on the order of three to five meters, differential GPS (DGPS), real-time kinematic (RTK) GPS, and precise point positioning (PPP) systems can provide centimeter and even millimeter-level performance when another reference receiver is used to correct signal errors in the client receiver. Assisted-GPS (A-GPS) is a similar approach that makes use of the cellular communication network to provide the required corrections and time for faster acquisition of GNSS signals with a lower signal-to-noise ratio (SNR) than an unassisted receiver would be capable of supporting.

The use of inertial sensors and multi-sensor fusion techniques can further improve the performance of GNSS-based PNT systems. Techniques using Kalman filters and more modern nonlinear estimators such as Particle Filters or Maximum Likelihood Estimators (MLEs) provide mechanisms for fusing multiple sensor modalities to form highly accurate position, velocity, attitude, and time (PVAT) estimates for coherent navigation and positioning.

In addition to TOA, TDOA, and FDOA/DD techniques, positioning systems can also make use of direction-of-arrival (DOA)/angle-of-arrival (AOA) measurements, as well as signal strength and RF fingerprinting (database correlation) to improve performance.

A significant drawback of GNSS-based PNT systems is that a minimum of four satellite/pseudolite signals are needed for 3-D positioning, and even more are needed if precise positioning is required. In addition, it isn't often always possible to simultaneously lock-on to four direct-path GNSS signals in urban environments or environments with large sky obstructions, including hills and mountains. Furthermore, client navigation systems that make use of direction-finding (DF) techniques and DOA/AOA measurements require sophisticated antennas and receivers with two or more feeds, which increase the cost and complexity of the client receiver navigation system. Ideally, client receivers should require only a simple antenna for precision navigation.

Another drawback of GNSS systems is that because of their weak signal strength, they can be intentionally and unintentionally jammed or denied. Since many navigation systems rely on GNSS for navigation and timing, they require an alternative means of navigation under GNSS-challenged environments. While inertial systems cannot be jammed, they have inherent biases that require external measurements to help calibrate the sensor biases. Vision-based navigation techniques have the potential advantage of being highly precise, but unlike RF-based systems cannot be relied upon under all-weather conditions.

A number of alternative RF-based navigation means exist, including, but not limited to, long-range navigation (LO-RAN) and Very High Frequency (VHF) Omnidirectional Range (VOR) measurements. LORAN and VOR provide alternative, terrestrial-based reference signals that can be used for navigation and, sometimes, time.

VOR is used by air traffic control to guide aircraft along common air corridors through the placement of VOR stations along the route. In addition, VOR stations are sometimes located at airports around the world to establish desired approaches. A VOR ground station transmits an omni-directional master signal and a second highly directional signal propagated by a large phased antenna array that rotates electronically 30 times a second. The phase of the secondary signal relative to the omni-directional signal as measured by the incoming aircraft is proportional to the bearing from the VOR array to the aircraft. We refer to this bearing as a line-of-bearing (LOB), or an angle-of-transmission (AOT) measurement.

The key feature of VOR is that while the measurement is obtained by the client receiver, it is obtained from the perspective of the transmitting reference station whose position is known. A shortcoming of the VOR system includes the fact that even if multiple VOR systems were used, they could only provide a 2-D navigation solution for aircraft. This is because the system is only capable of providing a 1-D AOT measurement ($\phi$: azimuth), not a 2-D AOT measurement ($\theta$: elevation, $\phi$: azimuth).

Furthermore, the VOR approach requires a rotating antenna pattern that cannot provide simultaneous (always-on) coverage for the entire sky. Hence, the measurement update rate of the system, and therefore, the performance of the system, is limited. In contrast, GNSS provides global coverage 100% of the time. Finally, the VOR system doesn't provide a time-of-arrival or a time difference-of-arrival measurement, which implies that a client aircraft cannot determine its own 3-D position and time by relying solely on VOR measurements.

Some systems, like the tactical air navigation (TACAN) system supplement VOR measurements with distance measuring equipment (DME), which is a transponder-based radio-navigation technology that measures slant-range distance between the transmitter and receiver by calculating the time-of-flight of the radio signals using two-way communication. When paired with DME, VOR provides both a 1-D LOB measurement and a slant-range measurement, which is only sufficient for 2-D (x, y) navigation because VOR provides an azimuth angle measurement but not an elevation (from the horizon) angle measurement. DME also requires RF transmissions by the client receiver, which is not always feasible or permitted for military and sometimes even civilian applications.

Similar to VOR, LORAN measurements can only be used to obtain 2-D (x, y) location estimates. In addition, neither LORAN nor VOR/DME is sufficiently accurate for precision (meter- or centimeter-level) navigation that is required for some applications.

The system described herein overcomes the deficiencies of the prior art to provide a means for meter- and centimeter-level local area 3-D positioning, navigation, and timing without relying on GNSS, and is capable of augmenting GNSS when available. Moreover, unlike GNSS-based systems, which require four satellites/pseudolites, the system described herein only requires two transmitters to provide a full 3-D position and time solution. A single transmitter/beacon is sufficient if the client system has an accurate clock.

BRIEF SUMMARY

The present exemplary embodiments provide an RF-based navigation reference system with one or more time-synchronized transmitters that enable an arbitrary number of (passive) client receivers to compute their own 3-D position, velocity and time relative to the reference system with as few as two transmitters unless a client receiver has an accurate clock, in which case a single transmitter is sufficient.

A novel reference transmitter with a direction-finding antenna that has at least two elements or at least two DF antenna modes enables the client receiver to measure the 2-D line-of-bearing (azimuth and elevation) from the transmitter to the client in the coordinate frame of the reference system, as well as the time-of-flight (TOF) of the received signals by emitting a time-synchronized unique RF waveform from each of the transmitter antenna elements or DF modes. The line-of-bearing measurements are also called angle-of-transmission (AOT) measurements since the measurements obtained by the client receiver are in the coordinate frame of the transmitter, not the receiver. AOT measurements reduce the required number of reference stations (satellites/beacons/pseudolites) for 3-D positioning and time from four to two.

While the client's estimated position, velocity and time is relative to the navigation reference system, if the reference system transmitter positions are known in global coordinates, the client position, velocity, attitude, and time estimates are also in global coordinates.

The client receiver does not require a direction-finding antenna to compute the angle-of-transmission of signals emitted by the navigation reference system. A simple single-feed antenna is sufficient. If, on the other hand, the client receiver has a direction-finding antenna, it can also measure the angle-of-arrival (AOA) of the received signals and can calculate its own attitude (roll, pitch and yaw) relative to the navigation reference system without requiring alternative sensors such as an inertial measurement unit (IMU), magnetic compass, or GNSS.

While not required, the client receiver can fuse measurements obtained from the reference system with measurements obtained from other sensors to improve its navigation and time estimates. The 2-D angle-of-transmission measurements can be combined with all measurement modalities including, but not limited to, angle-of-arrival, time-of-arrival, time difference-of-arrival, frequency difference-of-arrival, signal strength, RF fingerprinting, inertial sensor measurements, and multi-sensor fusion using optimal estimation techniques.

Moreover, angle-of-transmission measurements are not limited to RF systems and can be applied to optical and acoustic sensor systems with multi-mode emitters that are modulated in such a manner that a distant receiver is capable of determining the angle at which the received signal was transmitted.

There are numerous applications for systems making use of angle-of-transmission measurements, including GNSS-denied navigation and positioning. Like GPS satellites and pseudolites, AOT-enabled beacons can be placed on ground-based, sea-based, or airborne platforms to provide local-area navigation capabilities. Frequency-hopping AOT-enabled beacons can provide GNSS-denied navigation with a low probability of intercept (LPI) and a low probability of detection (LPD). Hence, unlike GPS which occupies a fixed spectrum, AOT-enabled frequency-hopping beacons would be harder to detect and track, thereby making them much less susceptible to intentional interference/jamming.

For example, the Joint Precision Approach and Landing System (JPALS) is a real-time kinematic landing system that uses GPS and a VHF/UHF communication system to enable autonomous landing with centimeter accuracy. Since JPALS relies on GPS, to the event that GPS is denied, JPALS will fail. The use of AOT-enabled beacons can provide robust navigation and landing capabilities under GPS-degraded and/or denied conditions, even on aircraft carriers.

Robotic surgery systems need to precisely measure the location of surgical instruments and internal organs within the human body. The use of AOT-enabled external reference beacons can provide the means to measure the location of a simple, microscopic, RF identification (RFID) tag that is embedded on and along with laparoscopic surgical equipment.

Radars and VORs used for the national airspace system (NAS) can be upgraded with AOT-enabled transmitters and client receivers to provide improved performance and safety for commercial and military flights across the nation and the globe. Civilian and military aircraft can make use of AOT as well as TOA measurements using simple antennas to estimate their own positions and can transmit that information to the air traffic control system.

Mobile client receivers in cellular networks can make use of AOT measurements to obtain their positions relative to the cellular network while remaining passive (non-emitting). When combined with TOA/TDOA measurements, the approach can provide highly robust navigation estimates, as well as time.

WiFi access points can make use of AOT and AOA measurements for self-localization to improve and mitigate receiver performance under multipath environments. Client WiFi receivers can determine their own location relative to the WiFi access points using AOT measurements, as well as the usual information obtained by tracking the coded WiFi signal. Furthermore, in light of the newer multi-input multi-output (MIMO) communication systems, AOT measurements can be naturally obtained from the multiple input measurements.

In short, any system that requires precise positioning or navigation, with or without GNSS signals, or with partial-GNSS signals, can also make use of AOT measurements for improved performance. Some novel advantages of the exemplary embodiments of the navigation reference system are:

A client receiver can measure the elevation and azimuth angle of the 2-D angle-of-transmission of each reference signal impinging on the client antenna, as well as its time-of-arrival without requiring a direction-finding antenna;

A client receiver requires signals from only two reference transmitters to estimate its 3-D position and velocity as well as time without requiring an accurate clock;

A client receiver with an accurate clock requires signals from only one reference transmitter to estimate its 3-D position and velocity; and A client with a direction-finding antenna and receiver can measure the angle-of-arrival of each of the reference signals to obtain an estimate of its 3-D attitude (roll, pitch and yaw), as well as its 3-D position, velocity, and time.

DETAILED DESCRIPTION OF EXEMPLARY EMBODIMENTS

Figure 1:
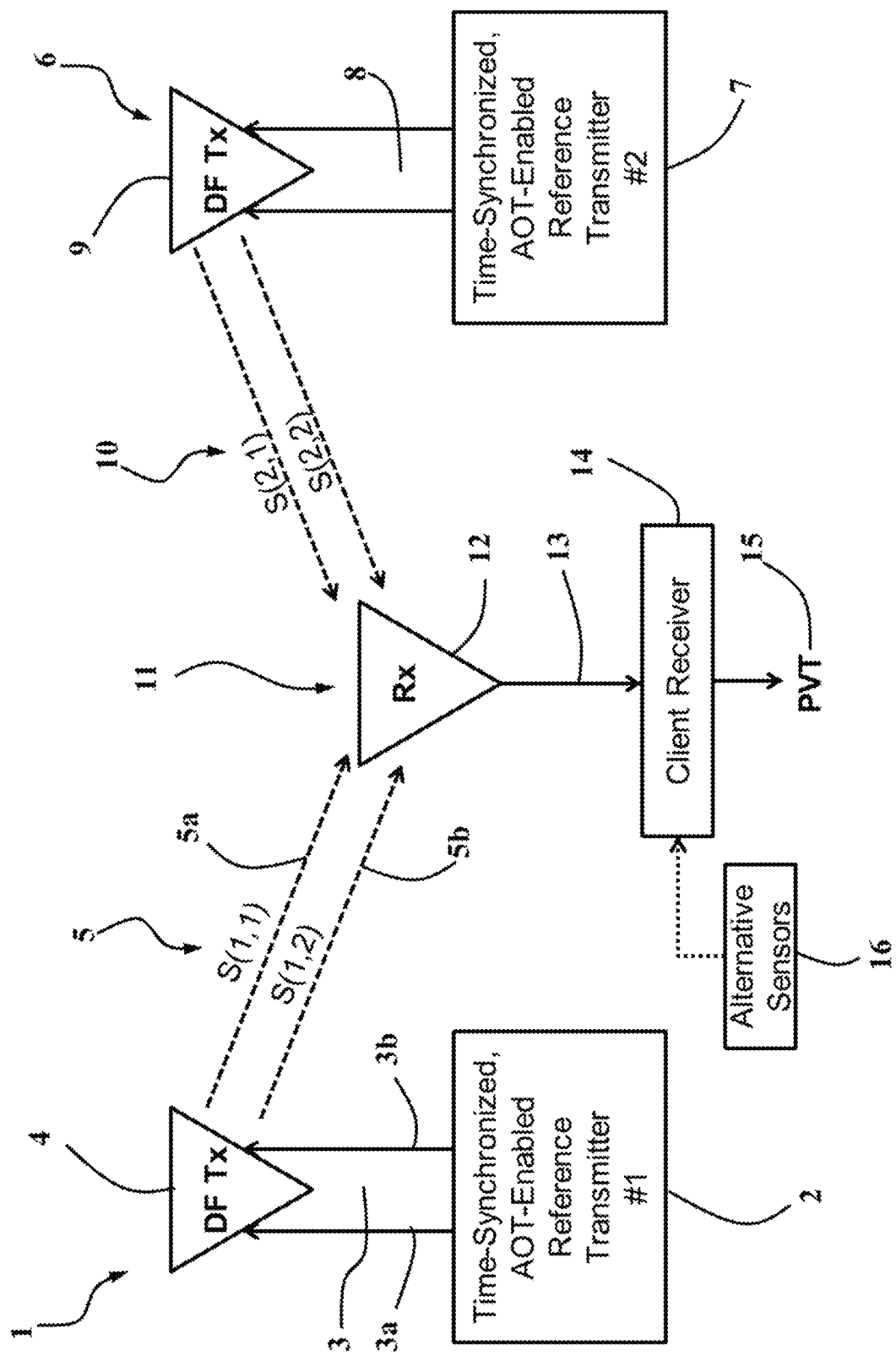
FIG. 1 is a schematic system diagram illustrating operation of an example navigation reference system with a single client receiver having a simple antenna and two time-synchronized reference transmitters, each of which is transmitting at least two unique waveforms from a direction-finding antenna.

Referring now to the drawings, which are intended to illustrate presently preferred exemplary embodiments of the invention only and not for the purpose of limiting same, the navigation reference system concept is shown in FIG. 1. The main component of the present exemplary embodiment is a reference station 1, which consists of an angle-of-transmission-enabled electronics package 2 that generates at least two uniquely identifiable (PRN codes) and time-synchronized waveforms that are output to a feed network 3 having at least two feeds 3a, 3b.

The feeds 3a, 3b, are connected to a direction-finding (DF) transmit (Tx) antenna 4 supporting at least two DF modes or at least two elements. The emissions 5 of the DF antenna include the uniquely identifiable and time synchronized waveforms S(1,1) 5a and S(1,2) 5b, where S(i,j) refers to the jth waveform (of M) of the ith reference station (of N). Each reference waveform must be unique and differentiable from the other waveforms. Hence, N reference stations each having M direction-finding modes/elements, will result in the generation of N×M unique waveforms. While the performance of the system will vary based on the DF antenna design, any antenna, provided it is capable of direction-finding, is sufficient.

A navigation reference system will nominally have at least two reference stations 1, 6, each having a transmitter electronics package 2, 7, feed network 3, 8, and a DF transmit antenna 4, 9, that supports at least two DF modes or elements, and emits at least two unique waveforms 5, 10, which are received by a client receiver 11. The client's receive (Rx) antenna 12 need not be a DF antenna. The signals obtained by the receiver antenna 12 are provided by the receiver feed 13 to the client receiver electronics package 14. The client receiver electronics 14 processes the received signals and identifies and separates each unique waveform to measure the relative phase and/or relative magnitude between the received waveforms.

If all transmit antennas are identical, any difference in received phase and/or magnitude must be either due to the angle-dependent complex gain differences of the transmit antenna modes, or due to path-length differences from each transmit element to the receive antenna element. The relative phases and/or magnitudes of the received waveforms, together with knowledge of the complex (phase and magnitude) transmit antenna patterns, permits the client receiver 14 to compute the angle-of-transmission from the transmit antenna to the receive antenna in transmitter coordinates. Angle-of-transmission measurements, along with waveform timing (time-of-arrival measurements) and reference station location data is used by the client receiver 14 to compute the 3-D position, velocity (PVT) and time 15 of the client.

The complex gain patterns of the transmit antennas, waveform timing, and reference station location data can be obtained by the client receiver from (a) the reference waveforms in the form of an embedded navigation message similar to GNSS signals; or by (b) providing the data to the client receiver prior to a mission. Alternatively, the received waveform data can be sent back to the reference stations for processing, which eliminates the need for the client receiver to know anything about the transmit antenna patterns, but requires RF emissions by the receiver, which is not always acceptable. However, nothing prevents the client receiver from making use of measurements obtained from alternative sensors 16 such as inertial measurement units (IMUs) containing gyroscopes and accelerometers, magnetic compass, GPS/GNSS, and vision sensors, among others, to compute its PVT estimate 15. The alternative sensors may also be active, such as lidar or radar, if permitted.

Figure 2:
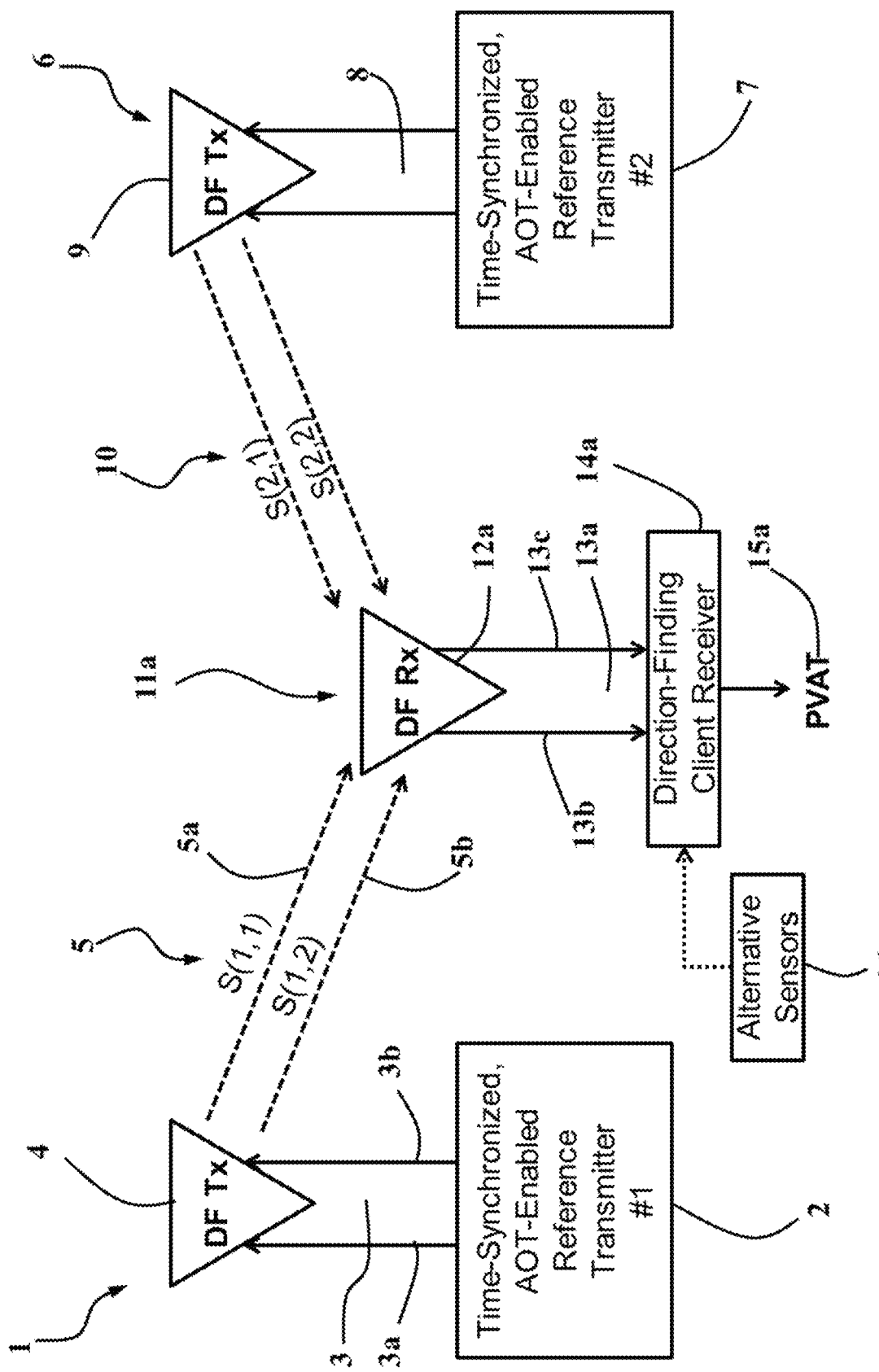
FIG. 2 shows the same example navigation reference system as FIG. 1 except that the client receiver also has a direction-finding antenna, thereby enabling the client receiver to estimate its own attitude (roll, pitch, and yaw) without requiring alternative sensor measurements.

As indicated by FIG. 2, the client receiver 11a may also include a direction-finding antenna 12a with feed network 13a having at least two feeds 13b, 13c, and a direction-finding receiver 14a. The ability to measure the angle-of-arrivals (AOAs) of the incoming signals, in addition to the angle-of-transmissions (AOTs), enables the receiver to compute its 3-D position, velocity, attitude (roll, pitch, and yaw) and time (PVAT) estimates 15a. Once again, measurements from alternative sensors 16 may be easily incorporated into the navigation solution using well-known data fusion techniques.

Figure 3:
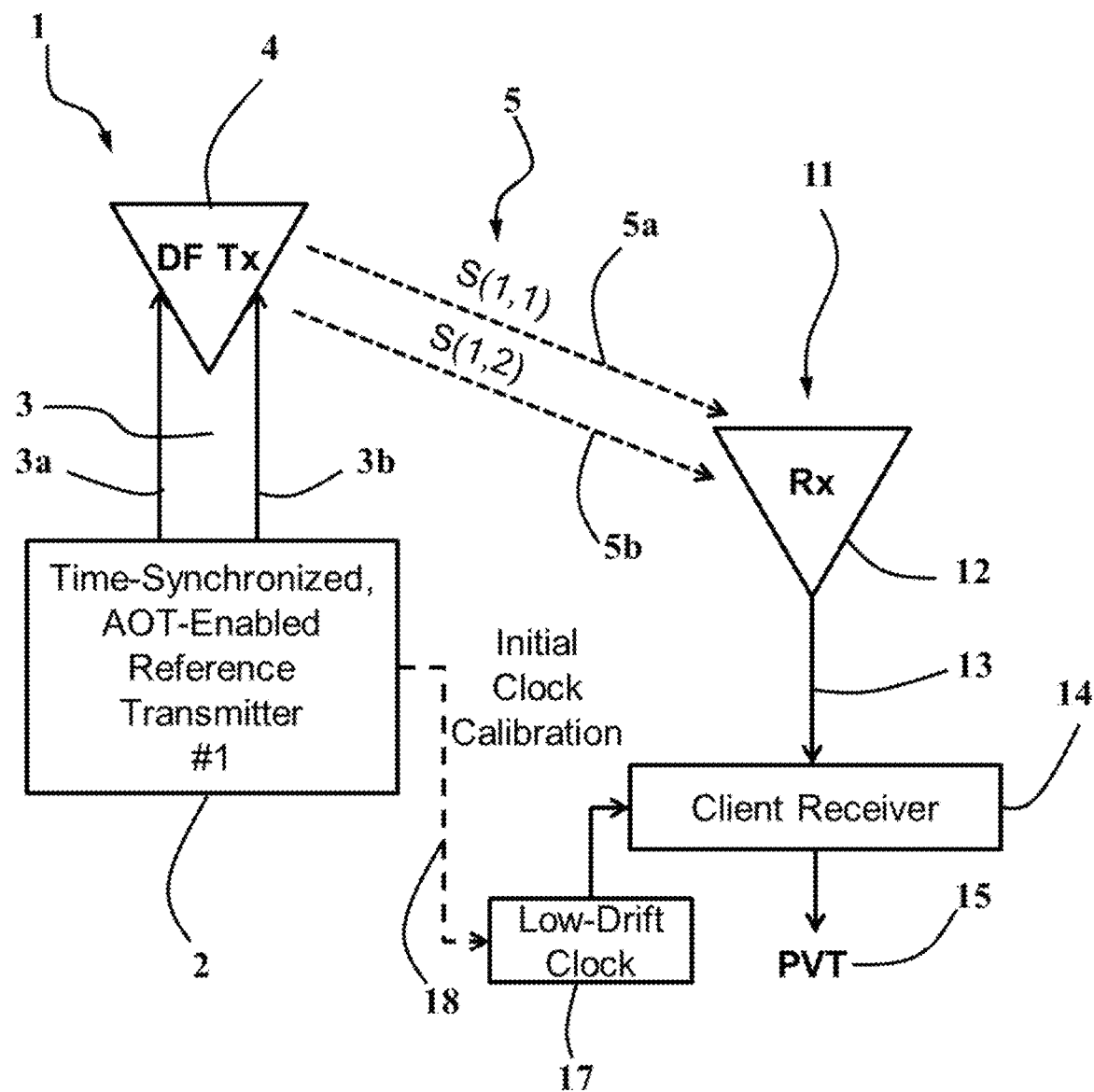
FIG. 3 illustrates an example system where a client receiver with an accurate (low-drift) clock can estimate its 3-D position, velocity and time (PVT) from reference signals obtained from a single angle-of-transmission enabled reference transmitter.
Figure 4:
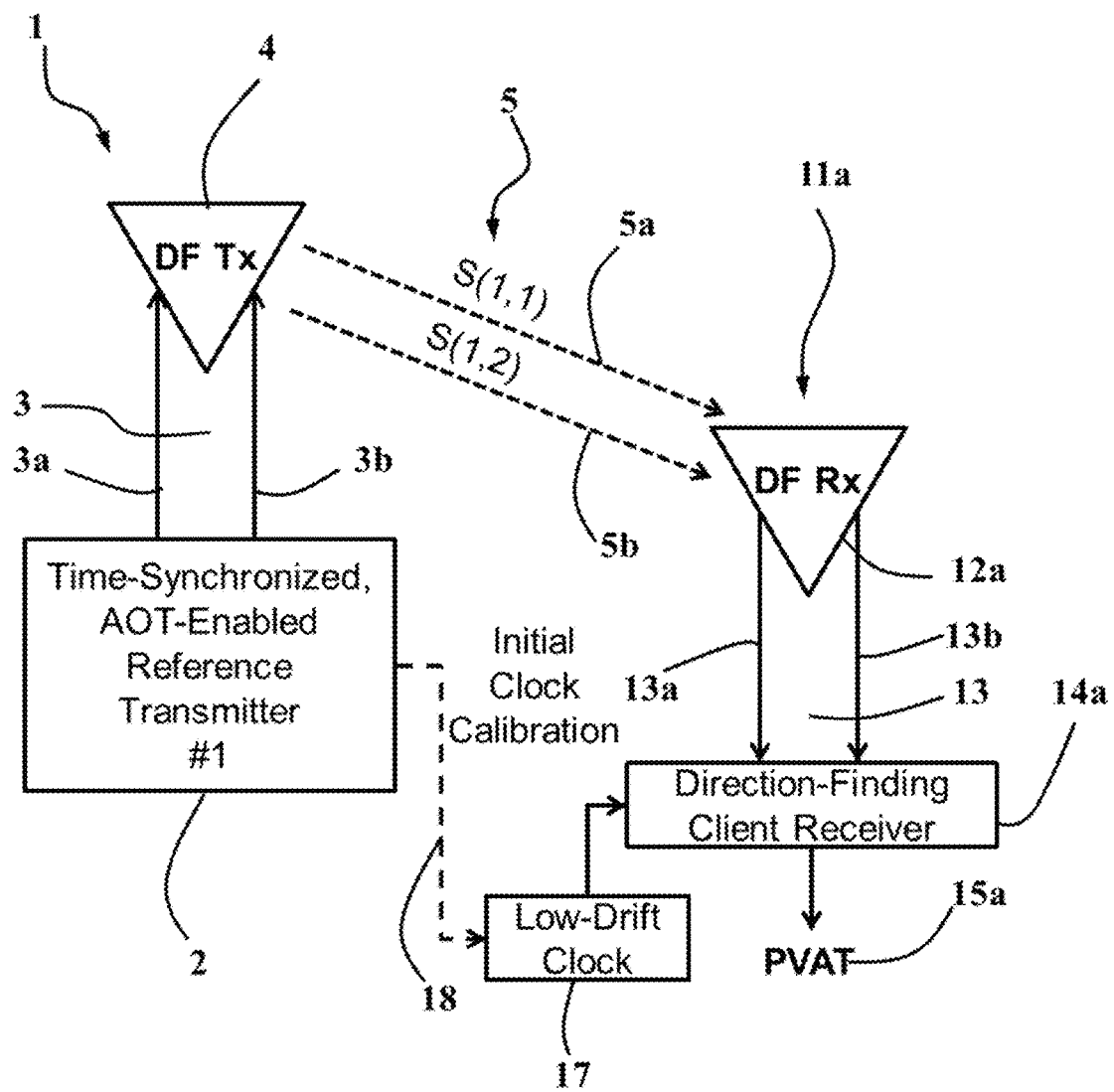
FIG. 4 is the same as FIG. 3, except that the client receiver has a direction-finding antenna and receiver.

An alternative sensor that has recently become very reasonable is a low-drift timing source, such as a chip-scale atomic clock. FIG. 3 illustrates that a client receiver having an accurate (low-drift) clock 17, which maintains its time relative to the reference transmitter 2 clock after an initial calibration 18, can estimate its position, velocity and time (PVT) 15 without any external aiding. Similarly, as indicated by FIG. 4, in addition to PVT estimates, a client receiver 11a having a calibrated low-drift clock 17, a direction-finding antenna 12a, and a DF receiver 14a, can also obtain 3-D attitude estimates, or 3-D PVAT estimates 15a.

In other words, an accurate (low-drift) timing source, such as a chip-scale atomic clock (CSAC) eliminates the need to compute time, thereby resulting in only three unknowns: the x, y, and z position of the client receiver. An initial calibration 18 may be required between the reference station and the client receiver to synchronize their clocks. The unknown 3-D position can then be estimated because the 2-D angle-of-transmission and time-of-arrival measurements obtained from two unique waveforms 5a, 5b, transmitted by a single reference station 4 provides three measurements: transmission azimuth angle, transmission elevation angle, and the time-of-flight (pseudorange), which are sufficient to fully determine the position of the client receiver 11a relative to the reference station, if time is known. This is because the receiver knows the reference station waveform (PRN code) transmission schedule and can directly measure the time-of-arrival of the transmitted signals and, therefore, pseudorange (range), which together with a single 3-D AOT measurement enables the determination of the 3-D location of the receiver relative to the transmitting system. Range can also roughly be determined by measuring the received signal strength.

Figure 5:
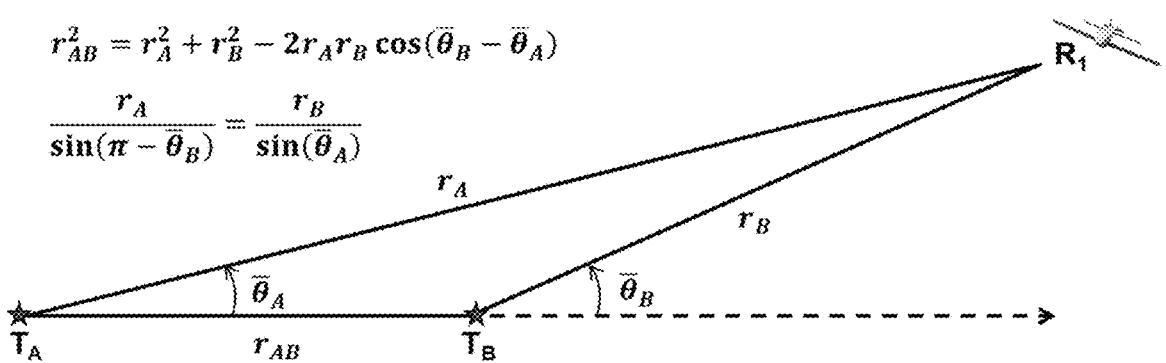
FIG. 5 illustrates navigation reference system geometry involving two transmitters and a single client receiver that is capable of measuring the transmission angles in order to compute its own position.

This concept is easily understood by considering the geometry associated with the reference system shown in FIG. 5. It is assumed in FIG. 5, that the relative locations of reference transmitters $T_A$ and $T_B$ are known. In that case, simple geometric identities, provided in FIG. 5, allow us to compute the position of the mobile receiver $R_1$ (relative to the transmitters) after measuring $\overline{\theta}_A$ and $\overline{\theta}_B$ and using the known baseline distance $r_{AB}$ between the two transmitters. Specifically, the two identities provided in FIG. 5 are used to solve for the relative ranges $r_A$ and $r_B$, from which we can compute the location of $R_1$.

Figure 6:
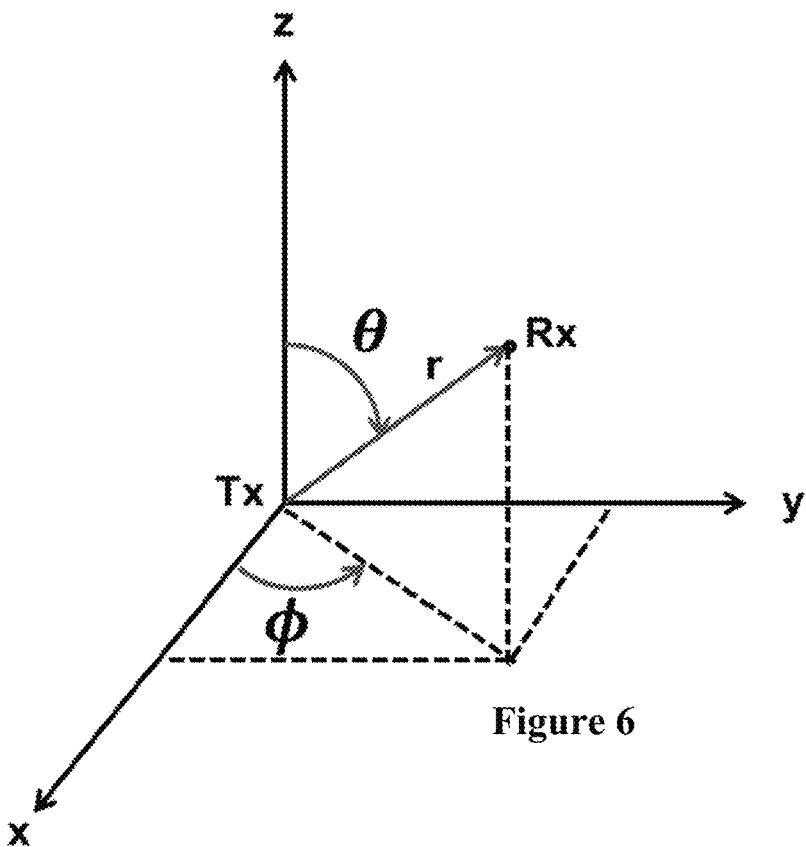
FIG. 6 illustrates a spherical polar coordinate system and the azimuth ($\phi$) and elevation ($\theta$) angles of the line-of-bearing that originates from the transmitter to the receiver.

While FIG. 5 is in 2-D, the concept is also valid in 3-D when both the transmitted elevation θ and azimuth φ angles are measured by the airborne platform in transmitter coordinates. FIG. 6 defines the elevation and azimuth angles in spherical polar coordinates, where θ is the elevation angle measured from the boresight (z-axis) of the transmitter (Tx) and φ is the azimuth angle measured from the x-axis in the xy-plane of the antenna. The client receiver, located at Rx, is at a distance r from the transmitter.

The 3-D case is identical to the 2-D case in that the lines-of-bearing from the two transmitters will intersect at the location of the client receiver. The LOBs are completely defined by the azimuth and elevation transmission angles relative to the transmitter coordinate frame. Hence, if a client receiver can measure the 2-D AOT (θ, φ) from two different reference transmitters, it can determine its own 3-D location.

Note from FIG. 5 that knowledge of time is not required to determine the location of receiver $R_1$. Hence, angle-of-transmission measurements enable 3-D position estimation without a clock. If, however, the transmitted signal is encoded with a navigation message and has embedded timing (ephemeris and almanac) information, once relative position is computed, relative time can also be unambiguously computed. This is essentially the same processing that is required for GPS/GNSS.

AOT measurements are extremely powerful. For example, a client receiver with a very large clock offset from the reference transmitters can compute its own position and synchronize time using AOT measurements before engaging carrier-phase tracking for highly accurate navigation.

As already discussed above, the flip-side of FIG. 5 is that a client receiver having a clock that is already synchronized with the transmitter can navigate in 3-D using a reference station (beacon). This is because knowledge of time and waveform timing is equivalent to knowledge of range, say $r_A$, and coupled with the knowledge of $\bar{\theta}_A$, and the known transmitter location ($T_A$), it is possible to compute the receiver's position at $R_1$ without requiring a second reference station.

While the navigation reference system only requires a minimum of one or two transmitters, the navigation and positioning performance of the system will improve as the number of reference stations is increased and if the client receiver makes use of a DF antenna. Specifically, a client with a direction-finding receiver will be capable of measuring its 3-D attitude as well as its 3-D position using only AOT-enabled reference transmitter signals, and without requiring an inertial sensor. Furthermore, since it becomes an over-determined system, the additional reference stations (transmitters) and receiver-based DF capability provides greater robustness against interference and jamming than the current state-of-the-art time-of-arrival (pseudorange)-based systems. In addition, TOA-based systems are incapable of determining attitude without another sensor such as an IMU and/or magnetometer.

It should be noted, however, that time-of-arrival (pseudorange) measurements are generally more accurate than direction-finding (AOA and AOT) measurements for large distances. Hence, DF measurements, in addition to TOA measurements, reduce the navigation system reliance on the number of reference stations (and line-of-sight (LOS) restrictions) and permit navigation even with poor clock drift.

Unlike current GNSS systems, the navigation reference system requires a direction-finding transmit antenna and associated DF transmitter electronics. In particular, the reference system relies on monopulse radar principles using direction-finding antennas and antenna arrays. Although direction-finding/angle-of-arrival measurement techniques are well known and will not be discussed in detail here, we provide an example of a simple DF antenna pattern in FIG. 7.

Figure 7:
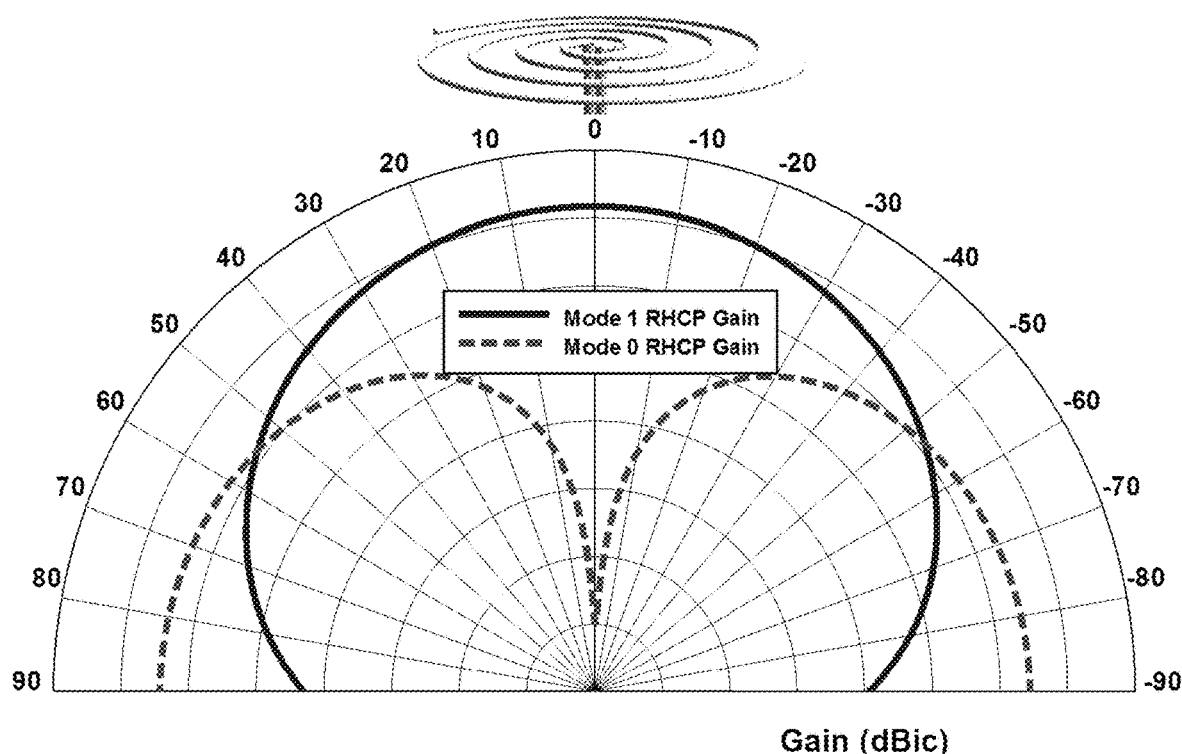
FIG. 7 provides magnitude plots of an exemplary complex antenna gain pattern for a two-arm spiral antenna having two antenna modes.

FIG. 7 illustrates the magnitude measurements of the two modes of a two-arm (two-feed) spiral antenna. The magnitude difference between the two modes can be used to measure the elevation angle of the received signal. Similarly, the relative phases of the two modes can be used to measure the azimuth angle of the received signal. More complex systems can include the gain pattern of the antenna for each polarization either in terms of linear polarizations (HPOL and VPOL) or circular polarization (LHCP and RHCP). The two modes of the spiral antenna are formed using a mode-forming network, which is also known as a Butler matrix, and is essentially a discrete Fourier transform (DFT). While only the two-arm spiral antenna pattern is shown, the specific antenna structure and patterns are immaterial, so long as the antenna being used by the transmitter is capable of direction-finding. Most conventional, multi-element antenna arrays can be used for direction finding.

Figure 8:
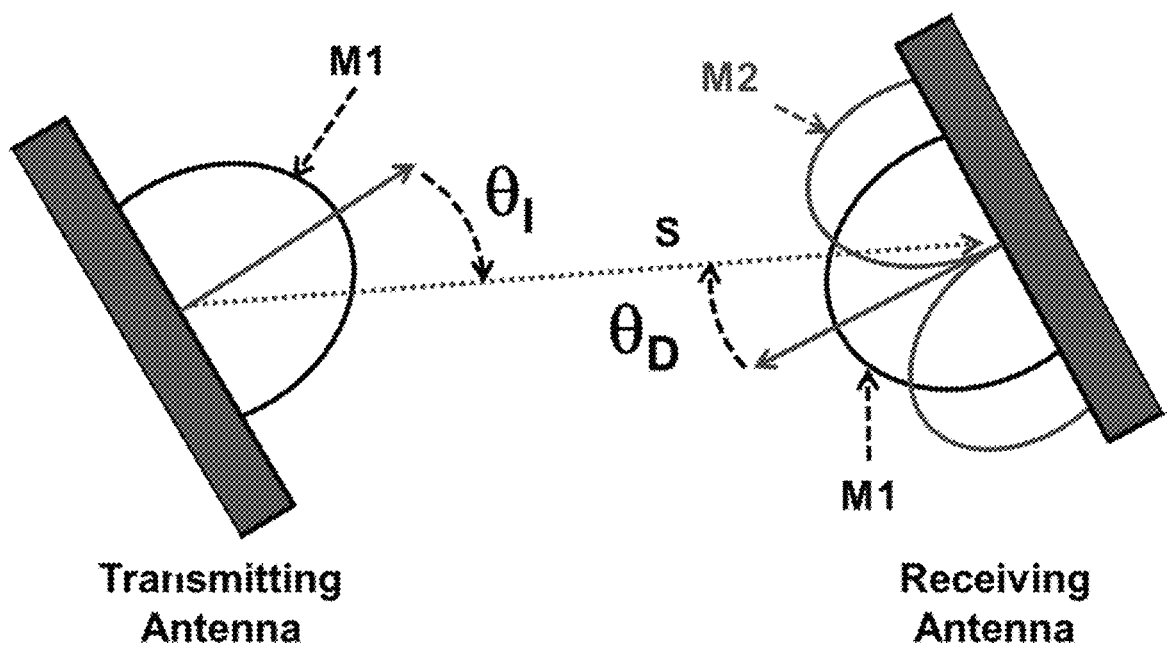
FIG. 8 illustrates a direct (conventional) angle-of-arrival measurement ($\theta_D$) obtained by a two-mode direction-finding receiving antenna in the coordinate frame of the receiving system.

Most all direction-finding systems make use of a DF antenna at the receiver as shown in FIG. 8. Obtaining a direct angle-of-arrival (AOA) measurement is relatively straightforward. As shown in FIG. 8, a single transmitted signal S is received by an antenna that has at least two DF modes (M1 and M2) or at least two elements (feeds) like, for example, the two-arm spiral antenna patterns shown in FIG. 7.

The magnitude and phase of the incoming signal is measured for each pattern (mode/element), and the relative magnitude and phase is computed and compared with the known gain pattern to determine the received AOA ($\theta_D$). Mathematically, signal S from the transmitting antenna is received by Mode 1 and Mode 2 of the receiving antenna with gain patterns $G_1(\theta)$ and $G_2(\theta)$, respectively. The measurements are $m_1 = G_1(\theta_D)S$ and $m_2 = G_2(\theta_D)S$ where $\theta_D$ is the AOA in the receiving antenna coordinate frame. The direct AOA is determined from $\theta_D = G_{2/1}^{-1}(r)$ where $r = m_2/m_1$ is the complex ratio of the two measurements and $G_{2/1}(\theta) = G_2(\theta)/G_1(\theta)$ is the complex relative gain ratio of the receiving antenna. Often, the mapping $G_{2/1}^{-1}(r)$ is not one-to-one and onto for the entire hemisphere, but is usable for some limited field-of-view.

Direct AOA measurements are thus obtained without requiring any information about the transmitting antenna, but are realized in the receiving-antenna coordinate frame. Direct AOA measurements require knowledge of the receiving antenna gain patterns. Alternatively, well-known AOA algorithms such as the Multiple Signal Characterization (MUSIC) algorithm can be used to estimate the direction-of-arrival using the known antenna gain patterns. These direction-finding and beamforming techniques are well known and are discussed in the selected references.

In contrast, the indirect AOA measurement is obtained by the receiver relative to the transmitter antenna coordinates. We refer to angle-of-transmission (AOT) as an indirect AOA measurement by the receiver because it is the AOA that the transmitting receiver would have measured had the receiving antenna been the one actually transmitting.

Figure 9:
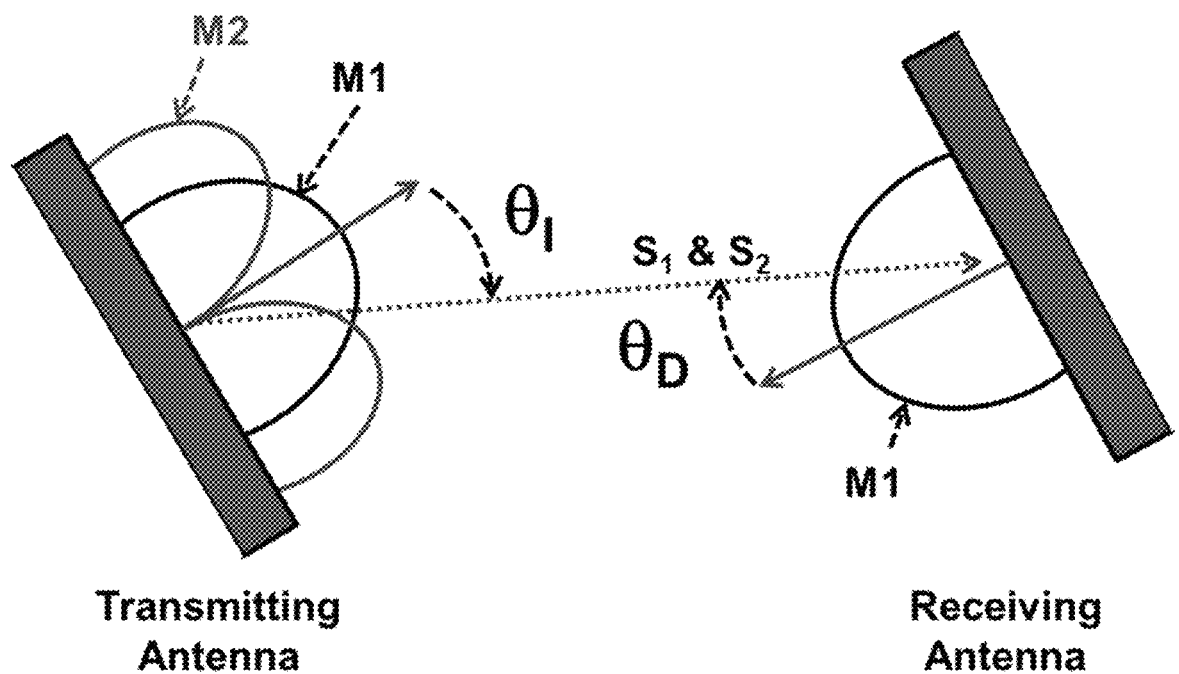
FIG. 9 illustrates an indirect angle-of-arrival (angle-of-transmission) measurement ($\theta_I$) obtained by a simple receiving antenna in the coordinate frame of the transmitting system.

As shown in FIG. 9, the indirect AOA can be obtained by transmitting the same signal with different (identifiable) pseudo-random number (PRN) codes (waveforms) ($S_1$, $S_2$) through each of the direction-finding modes (gains) of the transmitting antenna. The receiving antenna tracks each of the signals $S_1$, $S_2$, and compares the relative gain and phase of the two signals to the known relative gain pattern of the transmitting antenna to compute $\theta_1$.

Mathematically, a signal S is simultaneously broadcast by Mode 1 and Mode 2 of the transmitting antenna using two distinct PRN sequences. The signals arriving at the receiving antenna are $S_1 = G_1^x(\theta_T)S$ and $S_2 = G_1^x(\theta_T)S$, where $G_1^x(\theta)$ and $G_2^x(\theta)$ are the complex Mode 1 and Mode 2 gain patterns of the transmitting antenna, and $\theta_1$ is the angle-of-transmission in the coordinate frame of the transmitting antenna.

The signals measured by Mode 1 of the receiving antenna are $m_1^x = G_1(\theta_D)G_1^x(\theta_T)S$ and $m_2^x = G_1(\theta_D)G_2^x(\theta_T)S$, where $G_1(\theta_D)$ is the Mode 1 gain of the receiving antenna. Note that when we take the ratio $m_2^x/m_1^x$, the receiving antenna gain drops out and only the gain pattern of the transmitter antenna remains. The indirect AOA is determined from $\theta_T = G_{2/1}^{x\ -1}(r^x)$ where $r^x = m_2^x/m_1^x$ is the ratio of the two measured signals and $G_{2/1}^x(\theta) = G_2^x(\delta)/G_1^x(\theta)$ is the relative gain ratio of the transmitting antenna. Once again, the mapping $G_{2/1}^{x\ -1}(r^x)$ is not always fully invertible, and DF algorithms such as MUSIC can be used to estimate the angle-of-arrival or angle-of-transmission.

Figure 10:
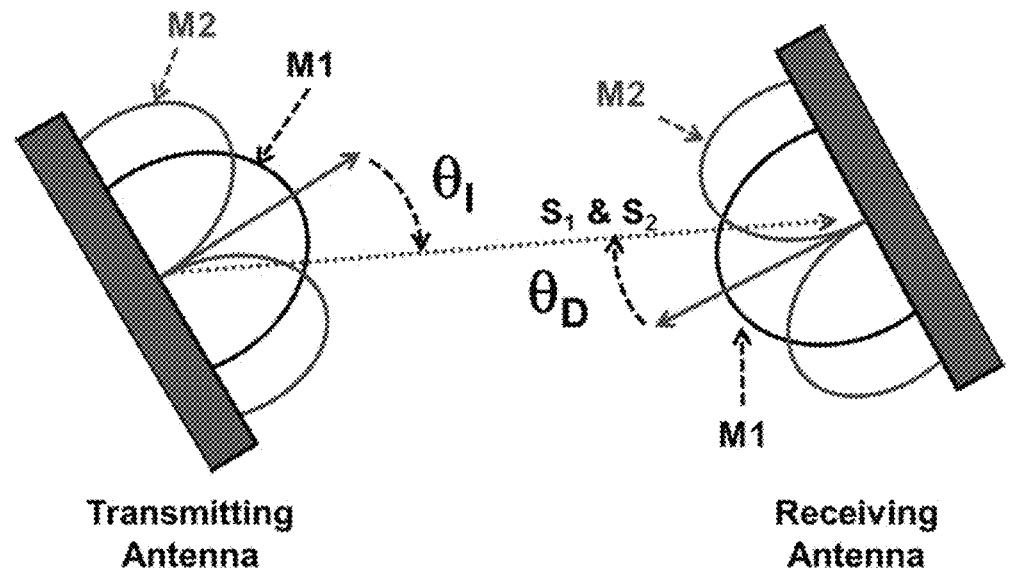
FIG. 10 illustrates both direct ($\theta_D$) and indirect angle-of-arrival ($\theta_I$) measurements obtained by a direction-finding receiver.

FIG. 10 shows the case where both the transmitting and receiving antennas are DF capable. In that case, an indirect AOA measurement can be obtained for each mode (element) of the receiving antenna. Because the modes are independent, each AOT measurement is also independent and provides another degree of redundancy. Moreover, the direct AOA of each transmitted signal ($S_1$ and $S_2$) can also be measured. Hence, for a transmitter with M modes (elements), and a receiver with P modes (elements), the receiver can obtain at least P independent 2-D AOT measurements, or 2P angles ($\theta$, $\phi$), and at least M independent 2-D AOA measurements, or 2M angles.

Note that since only two modes are required for direction-finding, there are potentially far more independent AOA and AOT measurements than computed above. Hence, a considerable amount of redundancy is enabled, and this redundancy can be used to improve the DF performance of the system by using all available modes to compute the AOA and AOT measurements using advanced algorithms such as MUSIC. Direct AOA measurements can be used to measure the receiver attitude (orientation) relative to the transmitting antenna coordinate frame, thereby providing full 3-D relative position and attitude of the receiver. This is not possible with TOA-only systems like GNSS.

It must be stressed that pseudorange (time-of-arrival) and pseudorange-rate (Doppler) measurements are obtained in exactly the same way as is currently done for GNSS/GPS receivers and require knowledge of the transmitter PRN codes and the timing of the codes (almanac) relative to a local clock. The local clock offset from the reference system may need to be estimated as is currently done with GNSS/GPS systems. Hence, the navigation reference system can leverage existing technology for correlation and cross-correlation processing of transmitter signals.

It is important to note that there are no fundamental differences between the direction-of-arrival algorithms used to estimate AOA and those used to estimate AOT. The DF processing is identical. The only difference is that AOA measurements require knowledge of the receiver antenna gain patterns, while the indirect AOA (AOT) measurements require knowledge of the transmitter antenna gain patterns. The AOA and AOT processing can be done either onboard the receiving platform, or they can be done another platform provided the measurements are transmitted to the computing platform. In addition, all direction-finding processing can be accomplished using space-time adaptive processing (STAP) algorithms as well as more traditional methods described in the references.

The transmitter antenna pattern can be provided to the client receiver either prior to a mission or it can be transmitted over a navigation message that is embedded in the transmitted waveform or it can be broadcast separately on another channel. Alternatively, if two-way RF communication is permitted, the measured ratio can be sent back to the transmitting antenna for processing, which knows its own gain patterns.

The ability to determine 3-D position (and attitude) without relying on carrier-phase measurements provides a mechanism with which to minimize and/or eliminate the integer ambiguities that generally exists with TOA/TDOA-based systems such as GPS. Another way to minimize and/or eliminate integer ambiguities, which is used in differential GPS processing, is to use code measurements to (roughly) determine position, but this requires four reference signals. Nonetheless, the two approaches, code and AOT measurements, can significantly minimize the ambiguity space, which can then be completely eliminated through filtering. IMU measurements can be also used to tightly track the carrier phase, thereby enabling cm-level ranging capability between the receiver and any transmitter. Any additional information, such as magnetometer and/or altitude measurements, or prior knowledge about the trajectory profile will improve the system performance.

Figure 11:
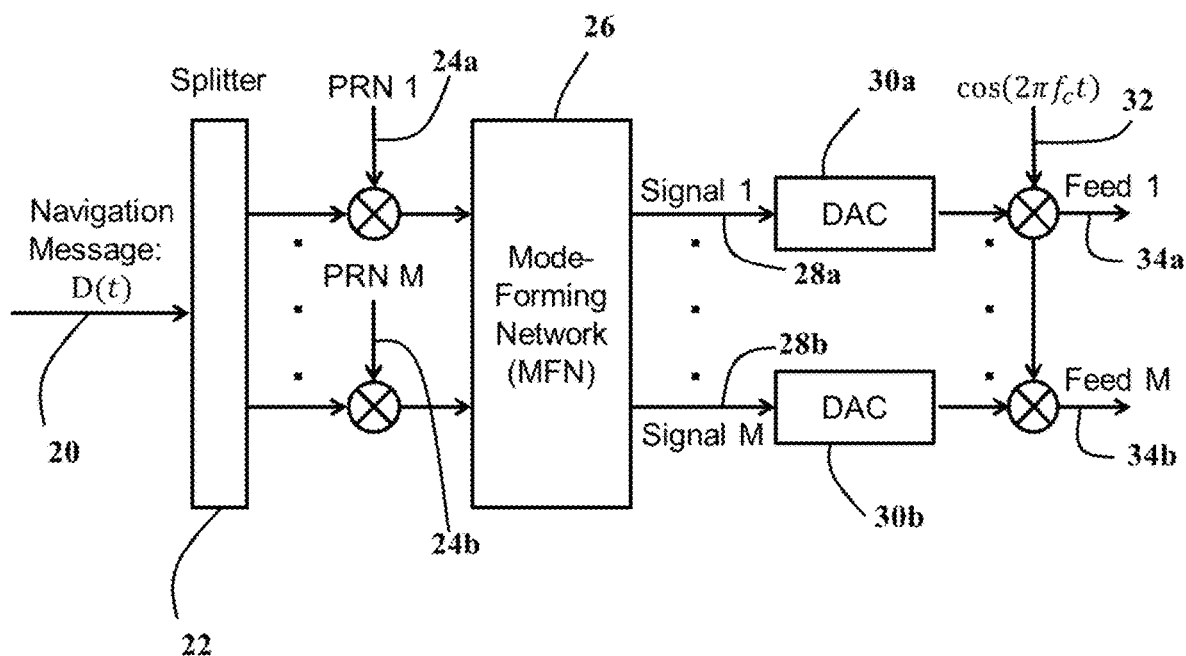
FIG. 11 shows an example of a basic transmitter architecture with a mode-forming network (MFN) that enables angle-of-transmission measurements by client receivers.

The following figures provide greater detail on the architecture of the navigation reference system. FIG. 11 shows a simple transmitter architecture for a system capable of providing angle-of-transmission and time-of-arrival measurements for the client receiver. For example, a navigation message, D(t), 20, similar to that used by GNSS systems, is split 22 into M identical channels where each channel is modulated by a unique pseudo-random noise (PRN) sequence 24a, 24b. Instead of PRN sequences, any orthogonal coding structure is acceptable so long as each channel waveform can be uniquely decoded by the receiver with minimal crosstalk between the channels.

The M channels are then fed into a mode-forming network (MFN) 26 which creates a set of M orthogonal signals. The MFN is also known as a Butler matrix, whose structure is that of a discrete Fourier transform (DFT). The M output signals 28a, 28b of the MFN are then converted into analog signals via digital-to-analog converters (DACs) 30a, 30b, and modulated by the carrier signal $\cos(2\pi f_c t)$, 32, where $f_c$ is the carrier frequency. Each modulated channel is then fed into one of the M antenna feeds 34a, 34b belonging to a direction-finding antenna such as the two-arm spiral shown in FIG. 7 or any M-element array capable of monopulse direction-finding.

Figure 12:
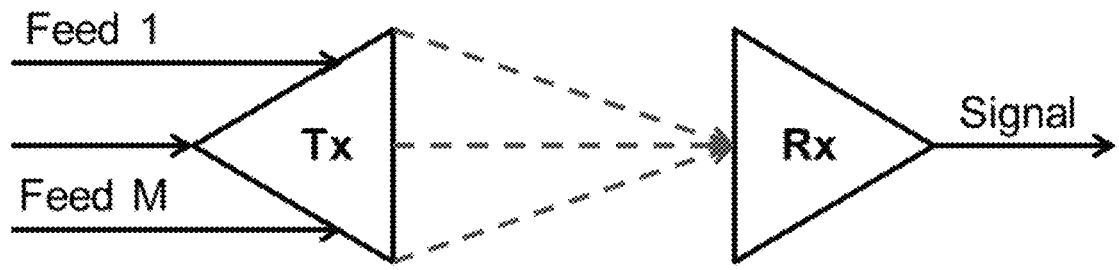
FIG. 12 shows a multi-output, single-input transmitter-receiver structure.

As shown in FIG. 12, the M modulated output RF signals are intercepted by a client receiver having just one element (feed). The M waveforms can then be processed by the client receiver to measure the angle-of-transmission of the received signals using any appropriate direction-finding algorithm. The navigation message 20 can include any information that is needed to decode the received signals and to perform direction finding, including information about the transmitter antenna complex gain patterns, antenna locations, and transmission timing. It is important to understand that the received signal is a composite of all the transmitted signals. Provided the PRN sequences were orthogonal, then the receiver will be able to separate out the signals by using a matching filter, or other common techniques used in communication systems.

Figure 13:
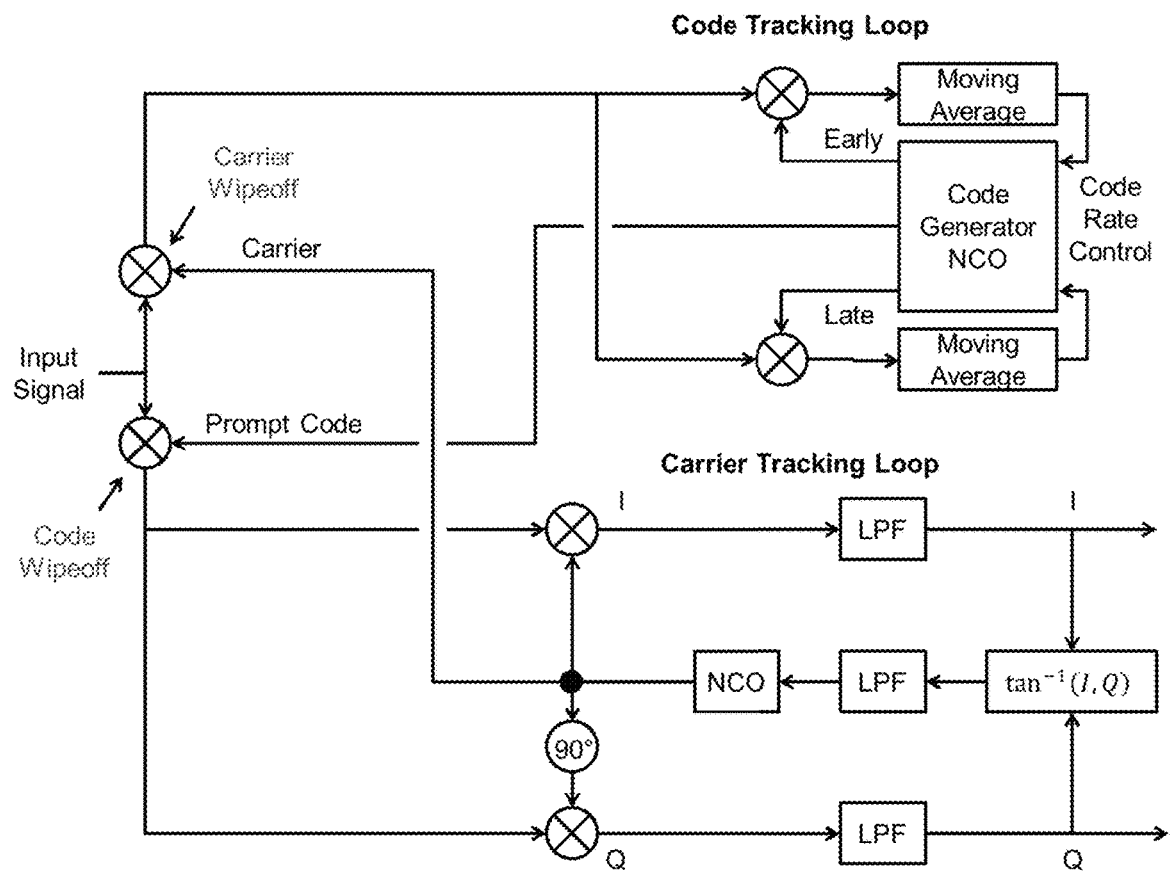
FIG. 13 illustrates the fundamental (and well-known) GNSS/GPS receiver architecture with (PRN) code and carrier tracking loops that is shared by the navigation reference system.

As discussed earlier, the receiver architecture is identical to that of standard GNSS/GPS receivers and uses all the same processing techniques. FIG. 13 shows the well-understood and fundamental tracking loops of a GNSS receiver including the code- and carrier-tracking loops. In general, the received (input) signal is first modulated by a copy of the carrier signal to conduct carrier wipeoff, and then by the early and late copies of the PRN code. The early and late copies of the code are equalized to generate the prompt code sequence, which is then used to modulate the input signal, thereby performing code wipeoff.

The code-less input signal is then modulated by an in-phase and a quadrature-phase version of the carrier signal to generate the I and Q measurements, which are then used to generate the carrier signal using a numerically controlled oscillator (NCO). Each transmitted PRN sequence requires a separate code generator and numerically controlled oscillator (NCO) at the receiver. The (I, Q) measurements for each PRN sequence are then used to determine the angle-of-transmission using standard DF techniques.

Figure 14:
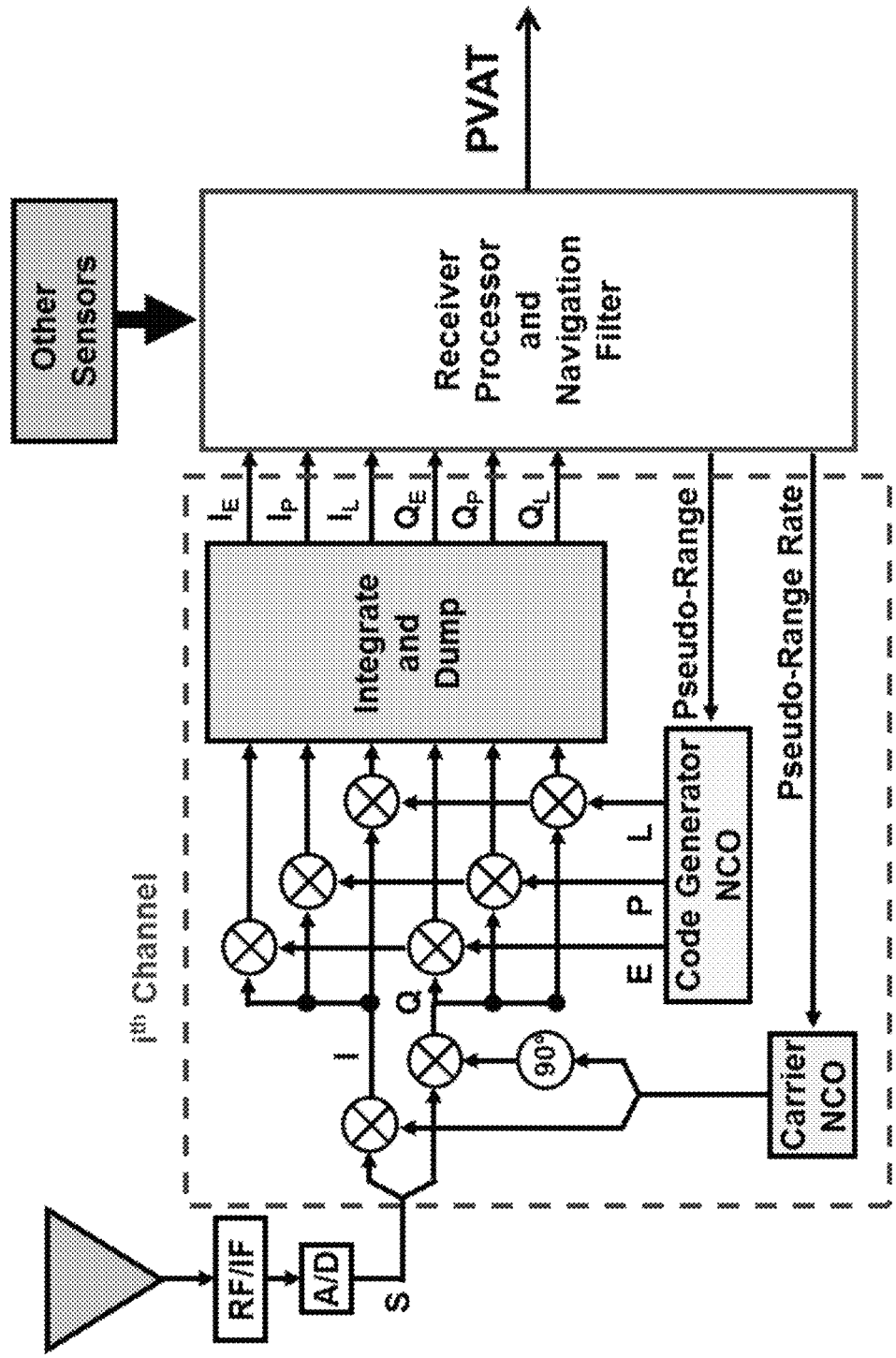
FIG. 14 shows an example compact carrier- and code-tracking architecture with a receiver processor and navigation filter.

FIG. 14 shows a compact version of the carrier- and code-tracking loops with a receiver processor and navigation filter. In FIG. 14, the carrier wipeoff occurs using both an in-phase and a quadrature-phase copy of the carrier signal. Code wipeoff follows as usual, but this time for both the in-phase (I) and quadrature-phase (Q) versions of the signal. This block is repeated for each PRN sequence (channel) being tracked. If there are N transmitters each with M modes or elements, then MN channels will be required. The early, prompt, and late versions of the (I, Q) signals for each PRN code are then used as inputs to an angle-of-arrival (AOA) algorithm using the known transmitter antenna patterns, possibly including polarization information.

Figure 15:
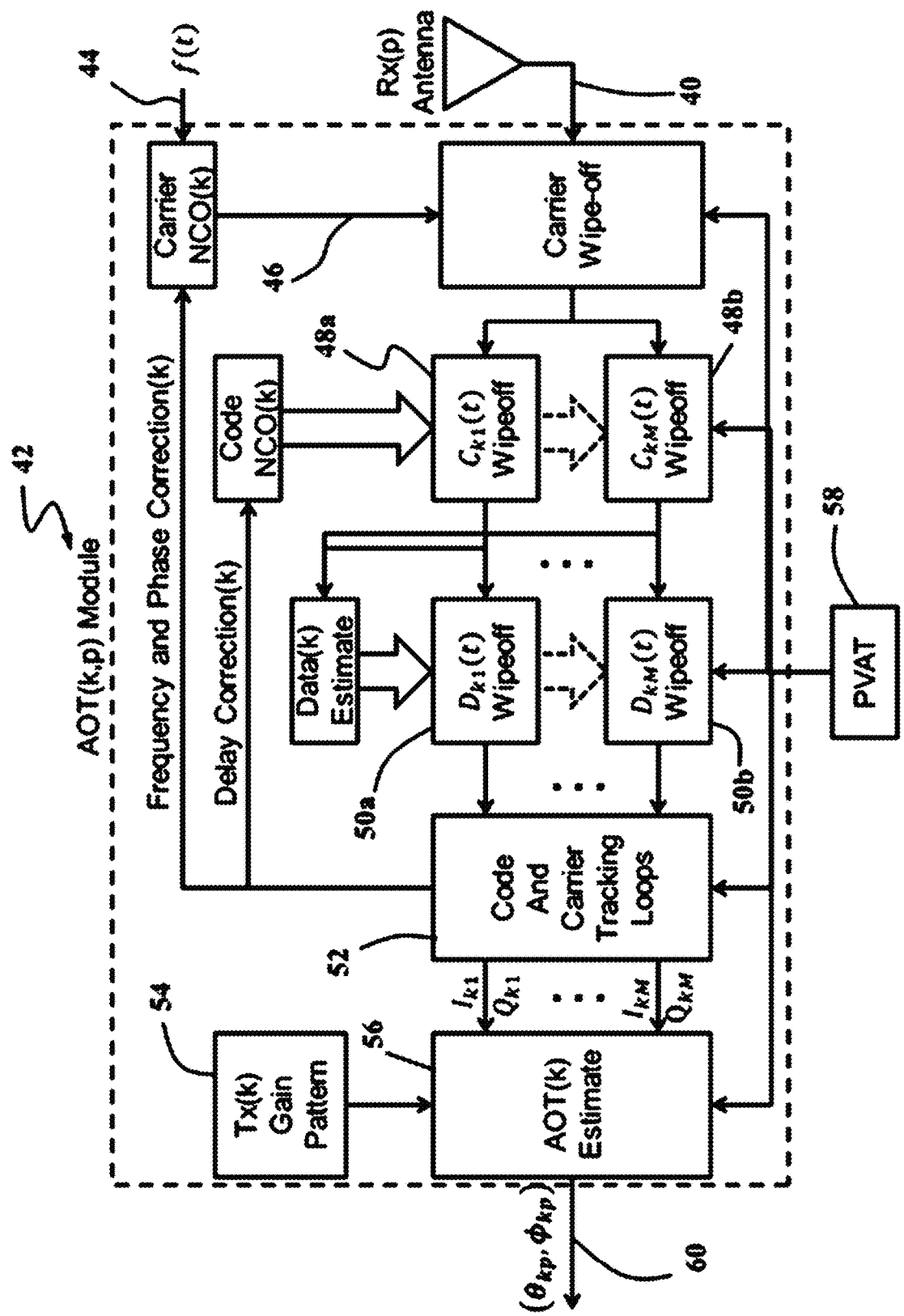
FIG. 15 illustrates an example angle-of-transmission processing module (AOT(k, p)) responding to signals received from the $k^{th}$ transmitter by the $p^{th}$ input port of the client receiver.

For example, given N transmitters, each with M transmit ports, and a client receiver with P input ports, FIG. 15 shows the AOT processing module 42 corresponding to the $k^{th}$ transmitter for the $p^{th}$ input-port 40 of a client receiver with the angle-of-transmission ($\theta_{kp}$, $\phi_{kp}$) of the $k^{th}$ transmitter as the output 60 of the AOT module 42. As illustrated in the figure, the client receiver must track each of the M unique PRN sequences belonging to transmitter k. As shown in FIG. 15, a potentially time varying (frequency-hopping) carrier frequency f(t) 44 is fed into a numerically controlled oscillator (NCO) block that outputs a single composite carrier signal 46 that is used for carrier wipeoff. Other architectures using M separate carrier wipeoff signals are also possible. Whatever architecture is used, it is important that the relative phases and magnitudes of at least two of the M signals from transmitter k must be measured in order to determine the angle-of-transmission.

As in standard GNSS processing, carrier wipeoff is followed by code wipeoff 48a, 48b, and (optionally) data wipeoff 50a, 50b. The carrier- and code-tracking loops 52 provide feedback to the carrier- and code-wipeoff blocks in order to maintain track of the different PRN sequences and the carrier. Just as in standard GPS/GNSS processing, the carrier- and code-tracking loops 52 also provide time-of-arrival (pseudorange) and Doppler (pseudorange-rate) measurements, but are not identified in FIG. 15 to keep the block diagram simple.

The resulting in-phase (I) and quadrature-phase (Q) measurements for each of the M signals are then used by the AOT estimation block 56 to determine the angle of transmission ($\theta_{kp}$, $\phi_{kp}$) 60 of transmitter k as measured by port p 40 of the receiver. Transmitter k gain patterns 54 are required for AOT estimation. These patterns may be obtained from the navigation data in real time, or obtained prior to system operation.

Optionally, the (I, Q) measurements can be relayed back to the transmitter (or any other processor) for AOT computation. Position, velocity, attitude and time (PVAT) estimates 58 obtained by the client receiver can be used to provide feedback to the various processing blocks in order to improve performance.

Figure 16:
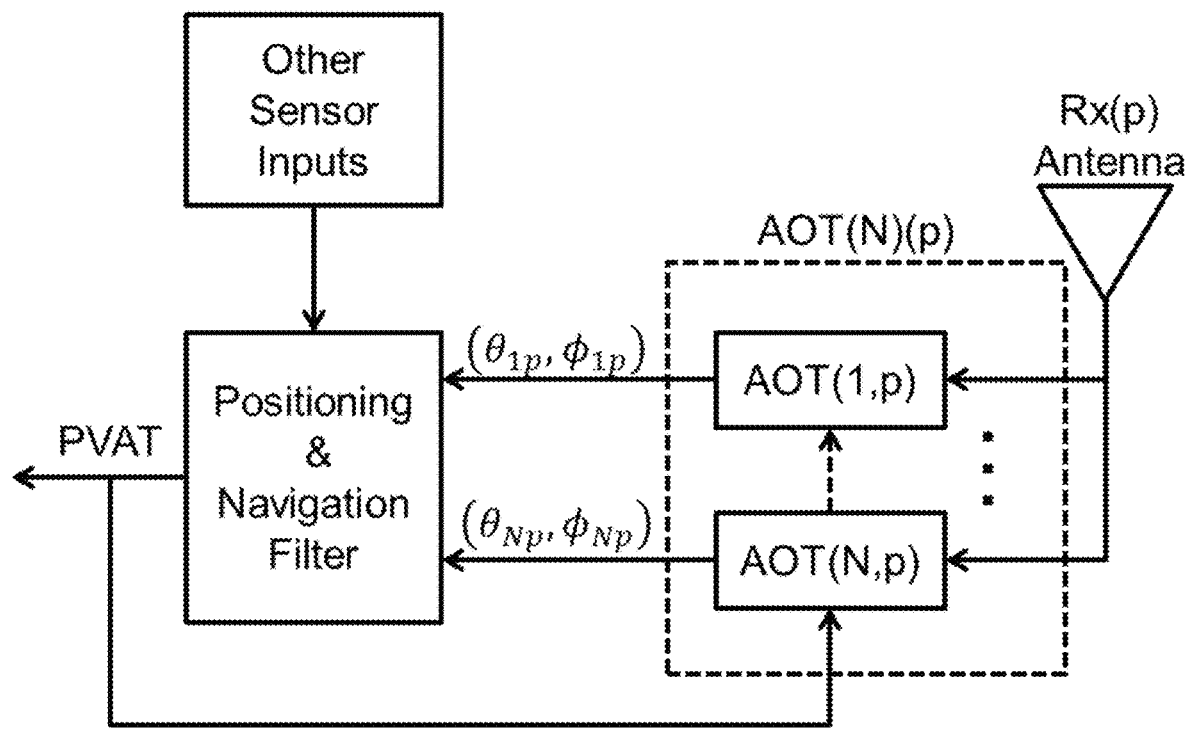
FIG. 16 shows an example composite angle-of-transmission processing module (AOT(N)(p)) responding to signals received from N transmitters by the $p^{th}$ input port of the client receiver.

As shown in FIG. 16, once the AOT measurement is determined for each of the N transmitters, as received by the $p^{th}$ receiver port, those estimates can be provided to the positioning and navigation filter for further processing. In FIG. 16, each of the blocks labeled 'AOT(k, p)' for k= 1, . . . , N, corresponds to the block 42 by the same name shown FIG. 15. Other sensor inputs can also be included in the navigation filter, including inertial sensor measurements as well as AOA measurements, if available.

Figure 17:
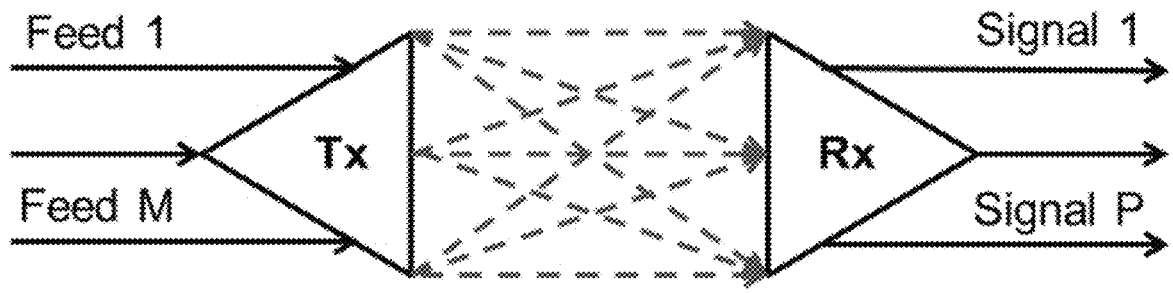
FIG. 17 illustrates an example multi-input (P) client receiver and multi-output (M) reference transmitter system.

FIG. 17 shows the input-output relationship for the case when the transmitter has M antenna feeds (modes/elements) and the receiver as P antenna feeds (modes/elements). FIG. 17 is thus an example of a multi-input (P) multi-output (M) MIMO system. As summarized in FIG. 18, if there is more than one input port (as in FIG. 17), then the AOT measurements for each of the transmitters can be determined for each port resulting in NP AOT measurements.

Figure 18:
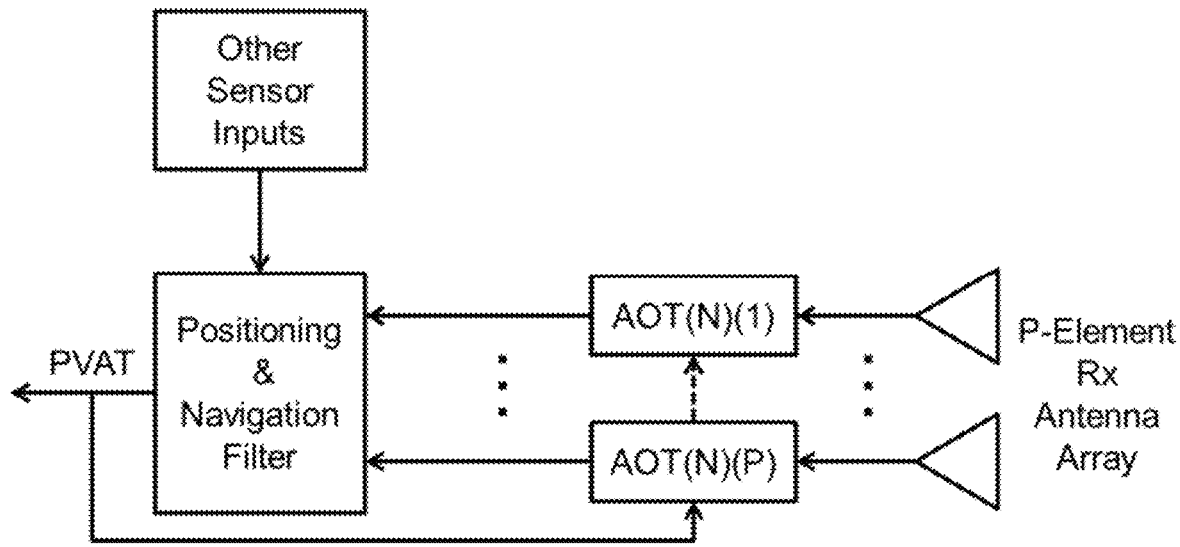
FIG. 18 shows example collection of angle-of-transmission processing modules for all P input-ports of a client receiver that is receiving signals from N transmitters, each of which is transmitting M unique waveforms.

In FIG. 18, the block labeled 'AOT(N)(p)' for p=1, . . . , P is defined in FIG. 16, and corresponds to all AOT(k, p) modules 42 for k=1, . . . , N as defined in FIG. 15. In other words, an N×P system will consist of NP AOT(k, p) modules 42 as defined in FIG. 15. All NP AOT measurements (as well as any AOA and TOA measurements) are provided to the positioning and navigation filter for PVAT processing.

Figure 19:
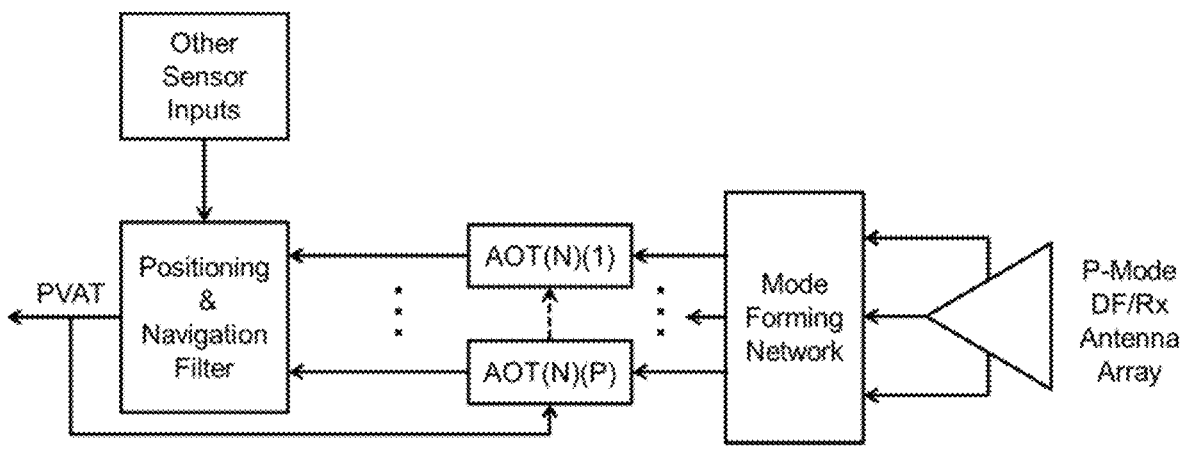
FIG. 19 is the same as FIG. 18 except that FIG. 19 includes a mode-forming network (MFN) for a P-mode direction-finding antenna.

FIG. 19 shows the same architecture as FIG. 18, except with a mode-forming network that is located prior to the carrier- and code-wipeoff blocks of FIG. 15. This architecture is useful when the receive antenna has a structure similar to a P-arm spiral antenna, for example, a P-element circular array.

If the receiver antenna is capable of direction-finding, then the client system can measure the angle-of-arrival of the incoming signals in addition to AOT measurements. Furthermore, the pseudorange (TOA) and pseudorange-rate (differential Doppler) of each of the incoming signals can also be measured in exactly the same way it is done for GNSS receivers.

Figure 20:
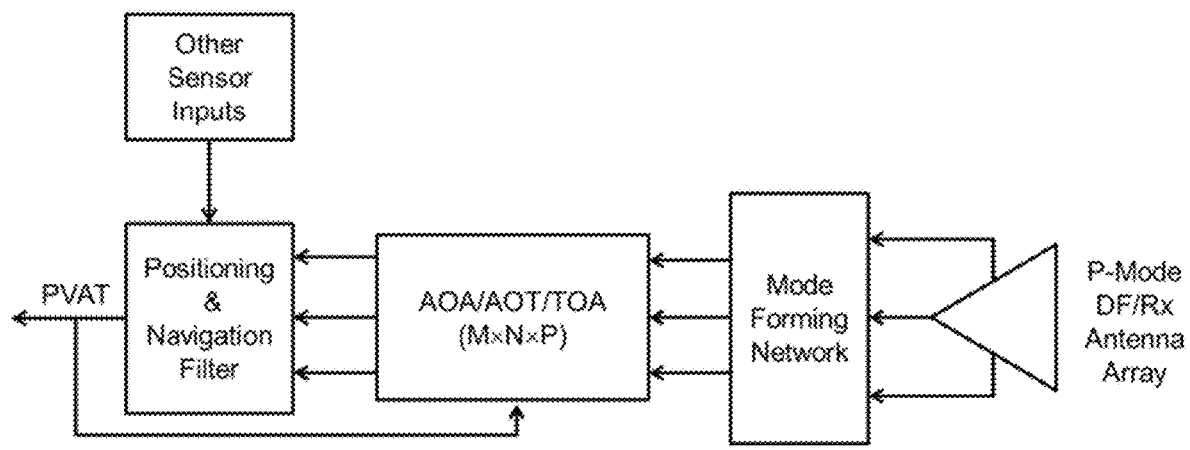
FIG. 20 is the same as FIG. 19 except that FIG. 20 notes that the MIMO system also supports angle-of-arrival (AOA) and time-of-arrival (TOA) measurements in addition to angle-of-transmission (AOT) measurements.

FIG. 20 provides the high-level block diagram of a receiver with a P-mode direction-finding antenna that is receiving signals from N reference transmitters where each transmitter is transmitting M unique PRN sequences. Note that PRN sequences are not repeated across transmitters. Hence, the receiver will need to track the same MN PRN sequences for each of its P ports. Some computational reductions are possible by sharing the code-tracking loops across all P input ports.

The transmitters do not need to be homogeneous. Each transmitter could have a different number of output signals. All AOA, AOT, and TOA measurements, together with other sensor inputs, can then be processed by the positioning and navigation filter to obtain the best possible position, velocity, attitude and time (PVAT) estimate.

Figure 21:
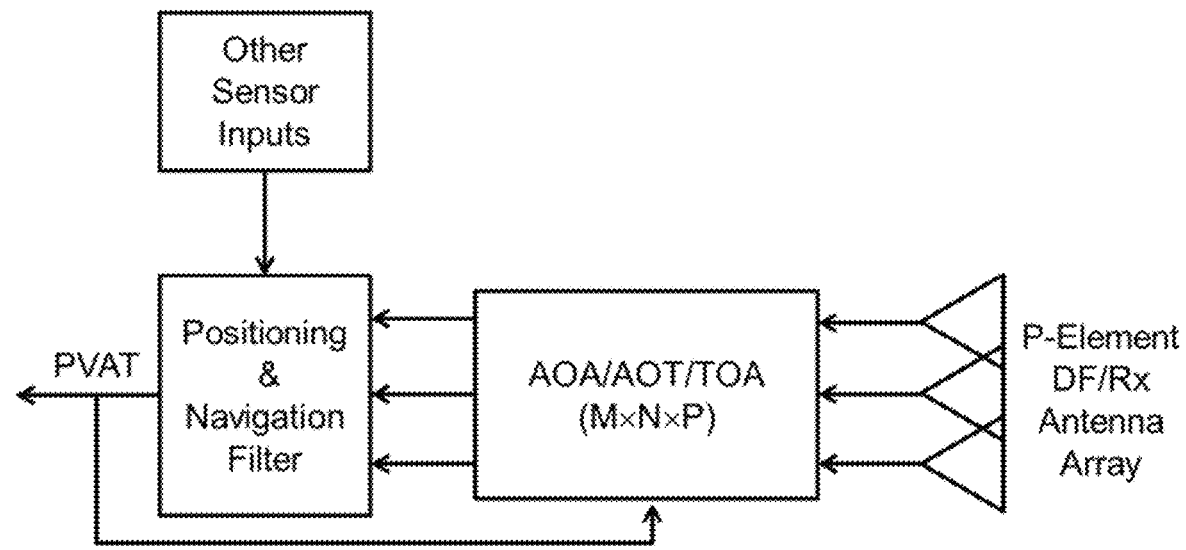
FIG. 21 is the same as FIG. 20 except that FIG. 21 does not include a mode-forming network (MFN).

A MIMO receiver architecture without a mode-forming network is shown FIG. 21. The reference to TOA measurements in FIG. 20 and FIG. 21 includes TOA (pseudorange) and Doppler (pseudorange-rate) measurements that naturally arise out of the same set of raw samples.

Figure 22:
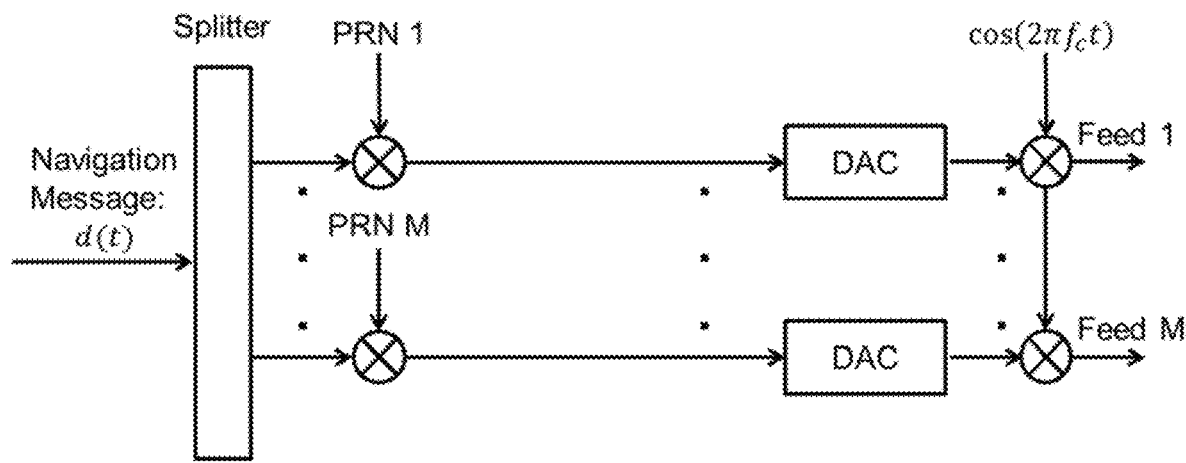
FIG. 22 is the same as FIG. 11 except that FIG. 22 does not include a mode-forming network (MFN).

The transmitter architecture has numerous potential variations. For example, FIG. 22 is identical to FIG. 11 except that it is missing the mode-forming network (MFN) 26.

Figure 23:
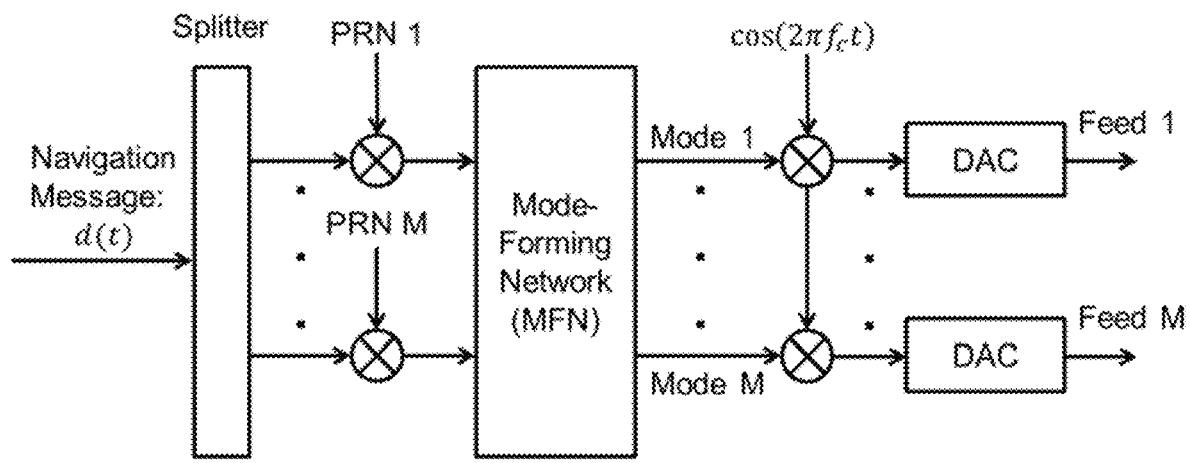
FIG. 23 is the same as FIG. 11 except that the mode-forming network (MFN) in FIG. 23 occurs earlier in the signal processing chain, prior to the up-conversion (modulation) step.

The transmitter architecture in FIG. 23 is also identical to FIG. 11 except that the carrier modulation 32 processing is placed ahead of the digital-to-analog converters (DACs) 30a, 30b in FIG. 23. This permits the forming of modes in baseband before the signals are up-converted to an intermediate frequency (IF) or a higher RF frequency.

Figure 24:
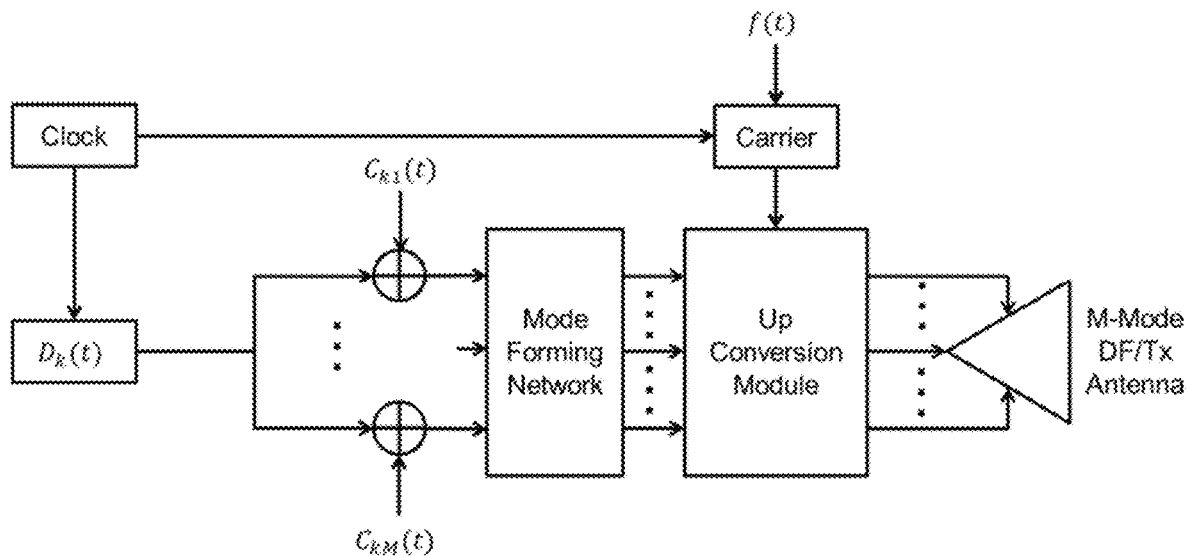
FIG. 24 illustrates an example reference transmitter system where all channels having unique PRN codes transmit the same navigation (data) message.

In FIG. 24, each of the M transmit channels for transmitter k has an identical data (navigation) message $D_k(t)$. However, as always, each of the M transmit channels have a unique code $C_{kj}(t)$ so that it can be uniquely identified by the receiver. In addition, the carrier frequency f(t) can be varied over time. For example, the transmitter system may perform frequency hopping to minimize the probability of detection and interception (LPD/LPI).

Figure 25:
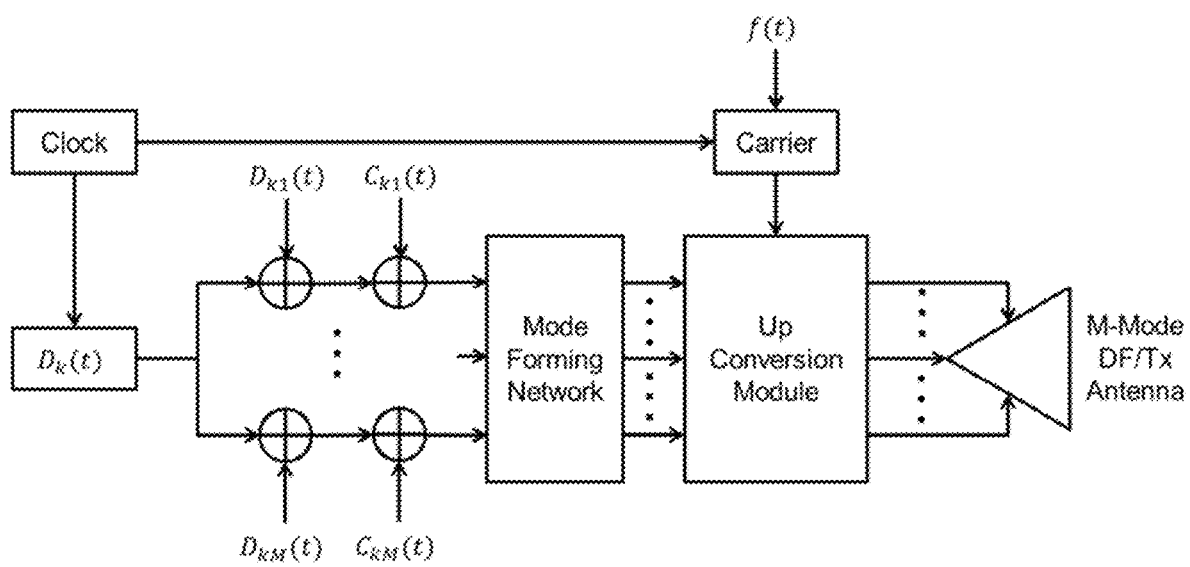
FIG. 25 is the same as FIG. 24 except that the system in FIG. 25 transmits a different navigation (data) message for each channel.

FIG. 25 is identical to FIG. 24 except that in FIG. 25, each of the M transmit channels for transmitter k has its own unique data message $D_{kj}(t)$, or the data message includes specialized instruction for each channel. For example, the gain patterns could be different for each output port.

Figure 26:
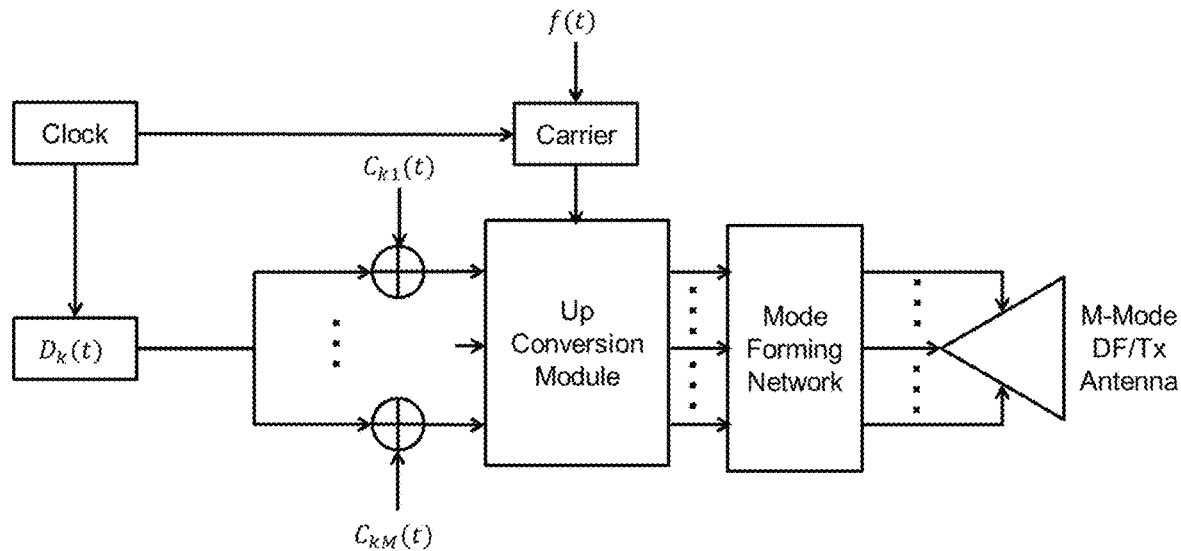
FIG. 26 is the same as FIG. 24 except that in FIG. 26 the mode-forming network (MFN) follows the up-conversion module instead of the other way around.

FIG. 26 shows the case when the mode-forming network is located upstream of the up-conversion module. This architecture has certain power-saving advantages if we only want to transmit from a subset of modes (elements) of the antenna, instead of using all modes (elements).

Figure 27:
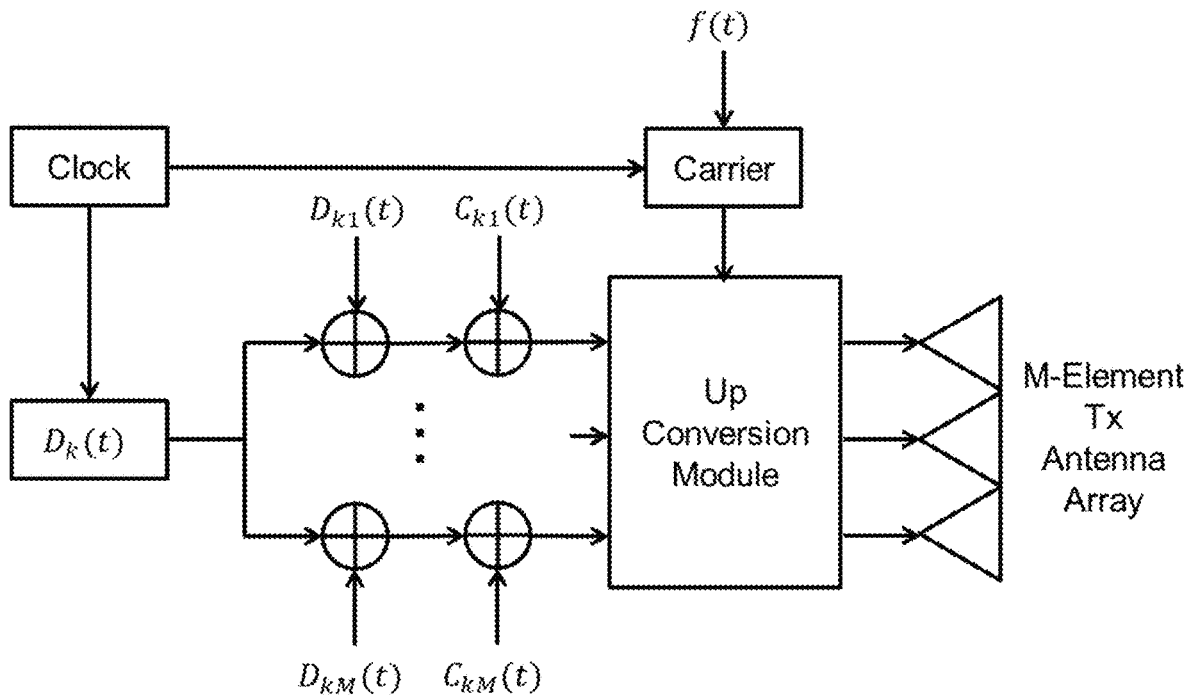
FIG. 27 is the same as FIG. 25 except that FIG. 27 does not include a mode-forming network (MFN).
Figure 28:
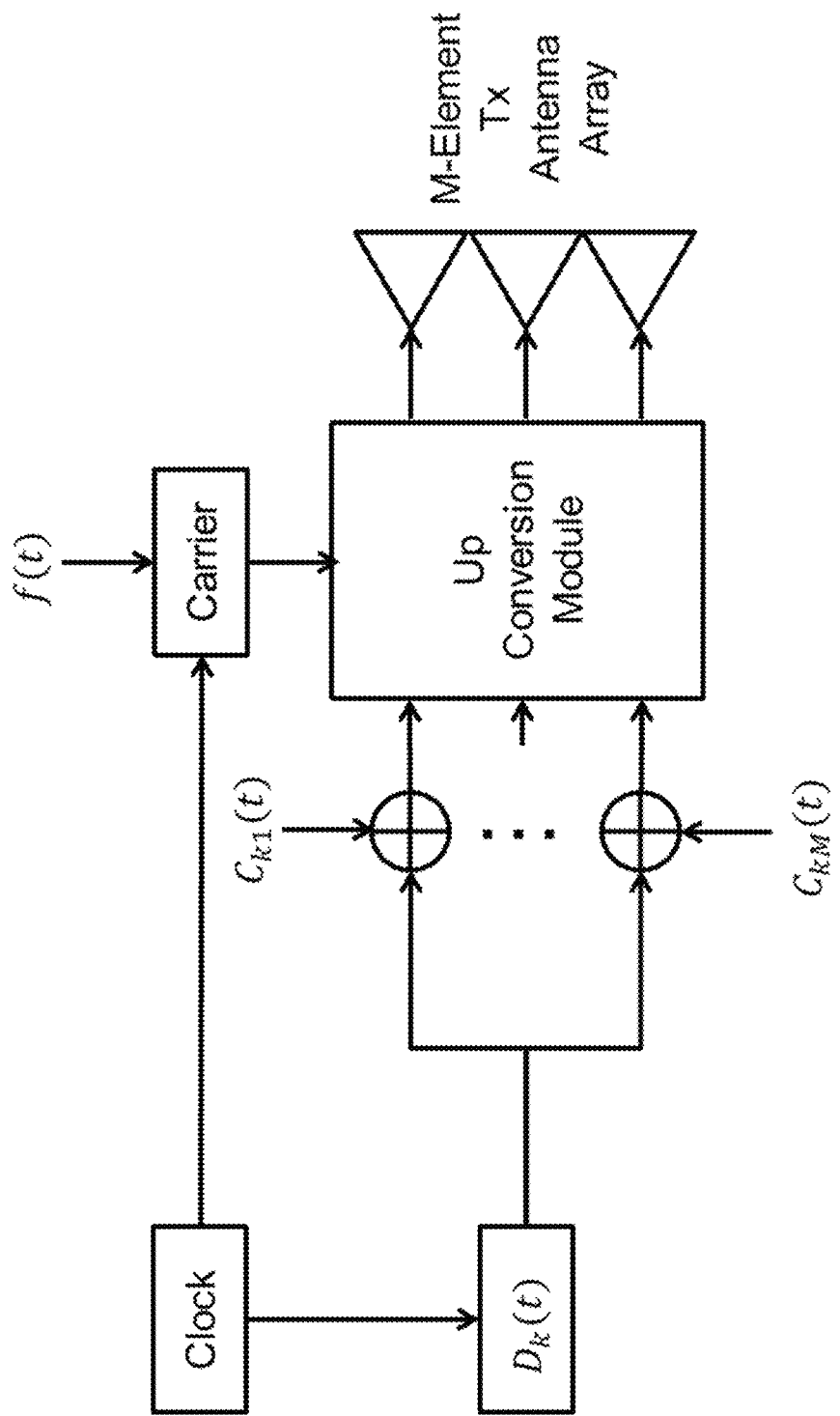
FIG. 28 is the same as FIG. 26 except that FIG. 28 does not include a mode-forming network (MFN).

FIG. 27 and FIG. 28 show variations on the above themes. FIG. 27 is missing the mode-forming network (MFN) and has a unique data code for each of the M transmit elements.

FIG. 28 is identical to FIG. 27, except that each channel has the same data/navigation message.

Figure 29:
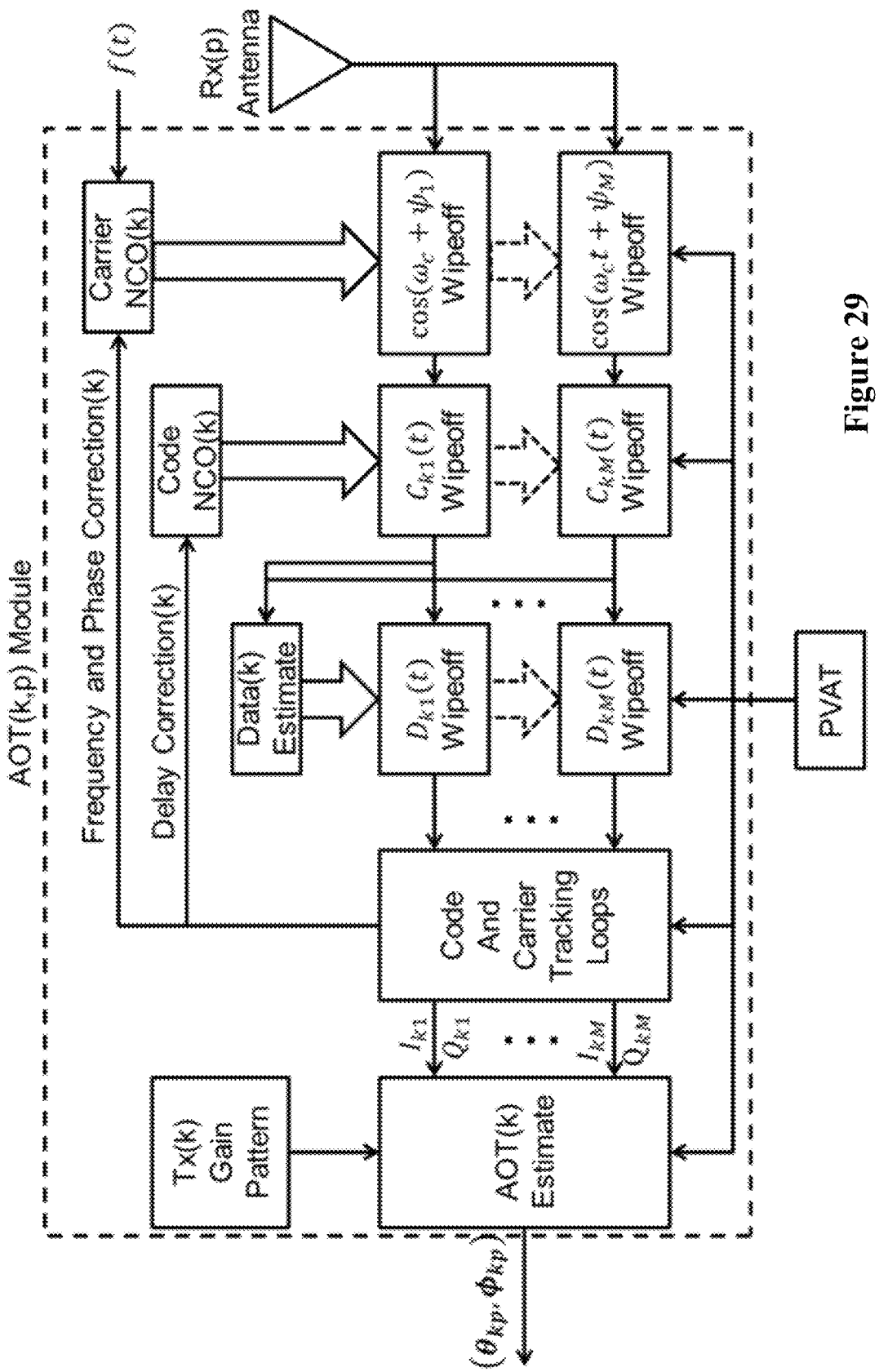
FIG. 29 is the same as FIG. 15 except that the architecture in FIG. 29 includes independent carrier wipe-off blocks for each unique PRN code, whereas FIG. 15 has a single carrier wipe-off block for each transmitter.

Finally, FIG. 29 shows the case when each receiver channel has its own carrier-tracking loop. The difference between the phases of each of the carrier-tracking loops provides the required measurements for angle-of-transmission estimates.

As demonstrated above, angle-of-transmission (AOT) measurements provide additional sensor modalities beyond current GNSS/GPS technologies that can be used to improve the PNT performance of a system. Specifically, an AOT-compatible system is capable of locating itself in 3-D and determining time with just two reference stations. A GNSS-based system requires four satellites. AOT measurements are ideally included with time-of-arrival (pseudorange) and Doppler (pseudorange-rate) measurements, like those currently provided by existing GNSS systems. An AOT-enabled system can also make use of AOA measurements provided the receiver has a direction-finding antenna.

In summary, direction-finding techniques such as angle-of-arrival and angle-of-transmission overcome the limitations of systems solely based on TOA measurements because they do not depend on time. The AOT and AOA measurements provide some significant advantages. For example:

A moving platform can estimate its 3-D position from a single RF source with a known location using: AOA measurements and a low-cost IMU and magnetometer, or AOT measurements and a low-cost IMU;

A platform can estimate its 3-D position from two geo-registered RF sources using: AOA measurements and a low-cost IMU, or AOT measurements alone;

A platform can estimate its 3-D position and orientation (attitude) from two geo-registered RF sources using: AOT and AOA measurements; and A platform can estimate its 3-D position and orientation (attitude) from three geo-registered RF sources using only: AOA measurements.

Although the present invention has been described with respect to a preferred embodiment thereof, it will be obvious to those skilled in the art that many modifications, additions, and deletions may be made therein without departing from the scope and spirit of the invention as set forth in the following claims.

What is claimed is:

1. A reference navigation system radio frequency (RF) transmitter for transmitting RF signals with direction-finding waveforms, said system comprising one or more reference stations having known relative positions and orientations and wherein each reference station comprises:
  (a) an RF transmitter having M radio-frequency output ports where M is at least two; and
  (b) a direction-finding antenna having M input feeds wherein said input feeds are connected to said transmitter output ports;
  wherein said RF transmitter is configured to generate M unique time-synchronized direction-finding waveforms with known waveform timing supplied to the input feeds of the direction-finding antenna via said output ports such that said direction-finding waveforms are broadcast by the direction-finding antenna to enable a configured client RF receiver to obtain from a received version of said direction-finding waveforms:
    (1) time-of-arrival (TOA) measurements for said direction-finding waveforms; and
    (2) angle-of-transmission (AOT) measurements in a three-dimensional coordinate frame of said reference station(s), said AOT measurements comprising an azimuth angle and an elevation angle relative to the reference station(s) coordinate frame such that said AOT measurements define a line-of-bearing originating at a reference station and extending to said client receiver in the three-dimensional coordinate frame of the reference station(s).

2. The reference navigation system RF transmitter of claim 1 wherein said direction-finding waveforms are configured to enable a client receiver to determine said receiver's pseudo-range to each of plural reference stations as well as the receiver's three-dimensional position, velocity and time relative to said three-dimensional coordinate frame by fusing the TOA and the AOT measurements obtained from at least two reference stations while making use of the known relative positions and orientations of said reference stations and waveform timing information.

3. The reference navigation system RF transmitter of claim 1 in combination with the client RF receiver, wherein the client receiver includes an accurate timing source synchronized with said system reference stations such that the direction-finding waveforms received from one reference station further enables the client receiver to determine said receiver's pseudo-range to said reference station as well as the receiver's three-dimensional position and velocity relative to said three-dimensional coordinate frame from (i) the TOA and AOT measurements and (ii) the known relative position and orientation of said reference station and waveform timing information.

4. The reference navigation system RF transmitter and client RF receiver as in claim 3 wherein the client RF receiver further comprises a direction-finding antenna having P output feeds where P is at least two, and is configured to obtain two-dimensional angle-of-arrival (AOA) measurements of said direction-finding waveforms in a local coordinate frame of the client RF receiver, wherein said AOA measurements enable the client RF receiver to further determine the receiver's three-dimensional attitude relative to the three-dimensional coordinate frame of the reference station(s).

5. The reference navigation system RF transmitter as in claim 2 wherein said transmitted direction-finding waveforms are configured to further enable a client receiver to obtain frequency-of-arrival (FOA) measurements from received waveforms and wherein said FOA measurements enable estimates of a pseudo-range-rate between said receiver and the reference station(s) to further improve the receiver's three-dimensional position and velocity estimates relative to the three-dimensional coordinate frame of the reference station(s).

6. The reference navigation system RF transmitter as in claim 2 wherein the RF transmitter further comprises a mode-forming network that pre-conditions transmitter output RF signals before input to the direction-finding antenna.

7. The reference navigation system RF transmitter as in claim 2 wherein the RF transmitter is further configured to generate the direction-finding waveforms with an embedded navigation message providing timing, position, and antenna pattern information about the reference station(s).

8. The reference navigation system RF transmitter as in claim 2 wherein the RF transmitter is further configured to generate the direction-finding waveforms from orthogonal pseudo-random number sequences that are modulated by a navigation message embedded with timing, position, and antenna pattern information about the reference station(s).

9. The reference navigation system RF transmitter s in claim 2 wherein the carrier frequency of the direction-finding waveform is periodically changed in a deterministic fashion.

10. The reference navigation system RF transmitter and client RF receiver as in claim 3 wherein the client receiver is configured to process additional measurements from alternative sources to further improve the receiver's position, velocity, and time estimate relative to the reference station(s).

11. A method for determining relative positioning, navigating and timing information at a client receiver site using received radio-frequency (RF) signals with direction-finding waveforms transmitted from a known position transmitter site, said method comprising:
   synchronizing the timing of one or more RF transmitter reference stations having known relative positions and orientation and, at each reference station:
   a. generating M unique time-synchronized signals with known timing where M is at least two;
   b. forming direction-finding waveforms by injecting each one of said M signals into an input feed of an M-feed direction-finding antenna; and
   c. transmitting the direction-finding waveforms, which at the client receiver site enables:
      (1) measuring the time-of-arrival (TOA) of a received version of said direction-finding waveforms;
      (2) measuring the angle-of-transmission (AOT) of said waveforms in a three-dimensional coordinate frame of the reference station(s), wherein
   measuring said AOT further comprises measuring an azimuth angle and measuring an elevation angle relative to the reference station(s) coordinate frame such that said AOT measurements define a line-of-bearing originating at a reference station and extending to said client receiver in the three-dimensional coordinate frame of the reference station(s).

12. The method of claim 11 wherein said direction-finding waveforms are configured to enable the client receiver to determine said receiver's pseudo-range to each of plural reference stations, as well as the receiver's three-dimensional position, velocity and time relative to said reference stations by fusing TOA and AOT measurements obtained from at least two reference stations while using the known relative positions and orientations of said reference stations and waveform timing information.

13. The method of claim 11 wherein the client receiver has an accurate timing source and the method further comprises synchronizing said timing source with at least one reference station and using thereafter received direction-finding waveforms from the reference station to further determine said receiver's pseudo-range to the reference station as well as the receiver's three-dimensional position and velocity relative to said reference station from (i) the TOA and AOT measurements obtained from the reference station and (ii) the known relative position and orientation of said reference station and waveform timing information.

14. The method of claim 13 wherein the client receiver further comprises a direction-finding antenna having P output feeds where P is at least two, and the method further comprises obtaining two-dimensional angle-of-arrival (AOA) measurements of said direction-finding waveforms in a local coordinate frame of the client receiver, wherein said AOA measurements by the client receiver are used to further determine the client receiver's three-dimensional attitude relative to the three-dimensional coordinate frame of the reference stations(s).

15. The method of claim 12 wherein said direction-finding waveforms received by a client receiver are used to obtain frequency-of-arrival (FOA) measurements and estimating pseudo-range-rate between said client receiver and a reference station to further improve receiver's relative three-dimensional position and velocity estimates.

16. The method of claim 12 further comprising preconditioning the RF signals with a mode-forming network prior to transmitting the direction-finding waveforms.

17. The method of claim 12 further comprising modulating said RF signals with a navigation message with embedded timing, position, and antenna pattern information.

18. The method of claim 12 further comprising generating said RF signals from orthogonal pseudo-random number sequences that are modulated by a navigation message embedded with timing, position, and antenna pattern information.

19. The method of claim 12 further comprising periodically changing an RF carrier frequency of the direction-finding waveform in a deterministic fashion.

20. The method of claim 13 further comprising processing additional measurements from alternative sources at a client receiver to further improve the client receiver's position, velocity, and time estimate relative to the reference station(s).

21. A reference navigation system radio frequency (RF) receiver for processing received RF signals carrying direction-finding waveforms in a system comprising one or more radio frequency (RF) transmitter reference stations having known relative positions and orientations and which broadcast at least two unique time-synchronized direction-finding waveforms with known waveform timing from a direction-finding antenna, said RF receiver being configured to process a received version of the direction-finding waveforms by:
   (1) deriving time-of-arrival (TOA) measurements for said direction-finding waveforms; and
   (2) deriving angle-of-transmission (AOT) measurements in a three-dimensional coordinate frame of said reference station(s), said AOT measurements comprising an azimuth angle and an elevation angle relative to the reference station(s) coordinate frame such that said AOT measurements define a line-of-bearing originating at a reference station and extending to said client receiver in the three-dimensional coordinate frame of the reference station(s).

22. The reference navigation system RF receiver as in claim 21 wherein said receiver is configured to determine said receiver's pseudo-range to each of plural reference stations in addition to the receiver's three-dimensional position, velocity and time relative to said three dimensional coordinate frame by fusing the TOA and AOT measurements obtained from at least two reference stations while making use of the known relative positions and orientations of said reference stations and waveform timing information.

* * * * *